(12) United States Patent
Heller

(10) Patent No.: US 6,222,440 B1
(45) Date of Patent: Apr. 24, 2001

(54) LOCATION, IDENTIFICATION AND TELEMETRY SYSTEM USING STROBED SIGNALS AT PREDETERMINED INTERVALS

(75) Inventor: Alan C. Heller, Dallas, TX (US)

(73) Assignee: Freshloc Technologies, Inc., Plano, TX (US)

( * ) Notice: Subject to any disclaimer, the term of this patent is extended or adjusted under 35 U.S.C. 154(b) by 0 days.

(21) Appl. No.: 09/027,968

(22) Filed: Feb. 23, 1998

(51) Int. Cl.[7] .................................................. H04Q 5/22
(52) U.S. Cl. ...................... 340/10.3; 340/825.31; 340/825.52; 340/825.34; 340/825.69; 342/463
(58) Field of Search .................. 340/10.1, 825.31, 340/825.52, 825.34, 825.69; 342/463

(56) References Cited

U.S. PATENT DOCUMENTS

| | | | |
|---|---|---|---|
| 4,482,895 | 11/1984 | Weinberg | 340/825.69 |
| 4,914,444 | * 4/1990 | Pifer et al. | 342/460 |
| 5,119,104 | 6/1992 | Heller | 342/450 |
| 5,239,294 | * 8/1993 | Flanders et al. | 340/825.34 |
| 5,276,496 | 1/1994 | Heller et al. | 356/141 |
| 5,355,222 | 10/1994 | Heller et al. | 356/375 |
| 5,387,993 | 2/1995 | Heller et al. | 359/155 |
| 5,426,425 | 6/1995 | Conrad et al. | 340/825.49 |
| 5,548,637 | 8/1996 | Heller et al. | 379/201 |
| 5,572,195 | 11/1996 | Heller et al. | 340/825.35 |
| 5,686,902 | 11/1997 | Reis et al. | 340/825.54 |
| 5,844,496 | 12/1998 | Seki et al. | 340/825.31 |
| 5,854,454 | 12/1998 | Upender et al. | 340/825.52 |

* cited by examiner

Primary Examiner—Brian Zimmerman
Assistant Examiner—Yves Dalencourt
(74) Attorney, Agent, or Firm—Akin, Gump, Strauss, Hauer & Feld, LLP

(57) ABSTRACT

A tracking system is implemented according to the invention in which the identification data of a wireless transmitter is divided into multiple bursts. Instead of transmitting the entire identification in a single burst, the identification is split among bursts, so that it takes a period of time to uniquely identify a particular transmitter. However, the time between bursts falls under tight tolerance, so once a transmitter is identified, it can be further identified based on when it transmits as opposed to what it transmits. In this way, high tractability can be maintained without repeatedly transmitting the entire identification code of the transmitter.

28 Claims, 16 Drawing Sheets

Microfiche Appendix Included
(1 Microfiche, 40 Pages)

150 — WIN$_A$ = h' 0 2 4 6 8 A C E 0 2 4 6 8 A C E (64 bits)
152 — WIN$_B$ = h' 1 3 5 7 9 B D F 1 3 5 7 9 B D F
FIG. 2A
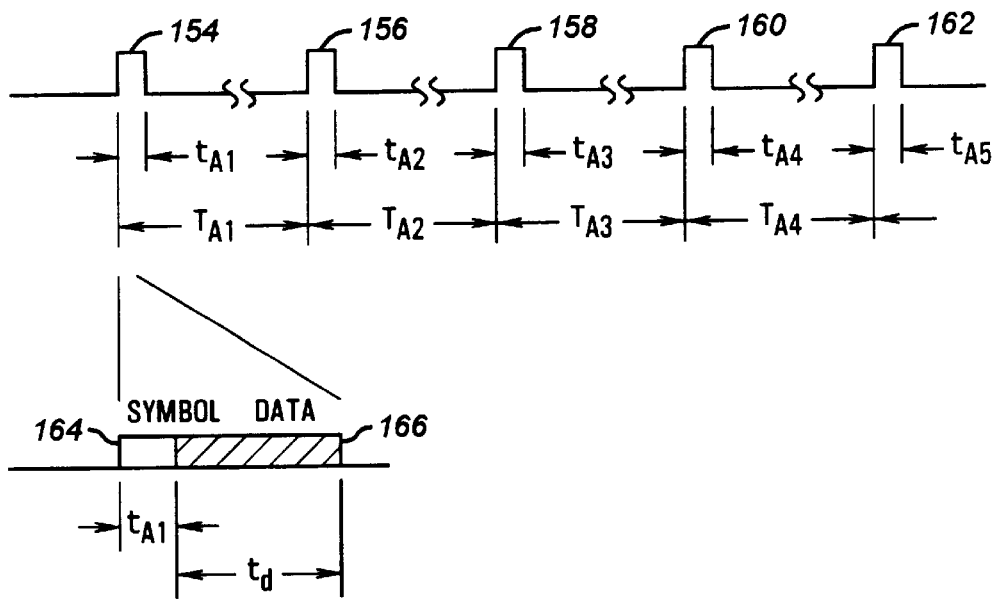
FIG. 2B
FIG. 2C

500 — EVENT:
    SYMBOL                       4 bits default, up to 64 bits
    ANTENNA_ID             16 bit identification of antenna or sensor
    DATA                         0-256 bytes
    TOA                           32 bit time of arrival
    SIGNAL_STRENGTH        8 bits

FIG. 9A

502 — SINGLE:
    SYMBOL                       4 bits
    TOA                           32 bits

FIG. 9B

504 — SINGLES_TABLE:
    SINGLE_ENTRY [0..15]      SINGLE

FIG. 9C

506 — SINGLE_INTERVAL_TABLE:
    POSSIBLE_PAIR [0..n]       array of PAIRS

FIG. 9D

508 — PAIRS:
    FIRST_SINGLE              pointer to SINGLE_ENTRY in SINGLES_TABLE
    SECOND_SINGLE            pointer to SINGLE_ENTRY in SINGLES_TABLE
    INTERVAL                   16 bits interval between FIRST_SINGLE and
                                       SECOND_SINGLE

FIG. 9E

510 — IDENTITY:
    WIN                           64 bits
    SYMBOL_INDEX              4 bit index into WIN of next expected symbol
    IDENTIFIED                 4 bit counter of number of valid nibbles in WIN
    LAST_TOA                   32 bit time of last time of arrival
    NEXT_TOA                   32 bit time of next expected time of arrival
    INTERVAL                   16 bit basic interval for transmitter
    SYMBOL_COUNTER          32 bit counter of number of transmitted WINs
                                       since transmitter turned on

FIG. 9F

512 — IDENTITY_TABLE:
    IDENTITY_ENTRY[1..m]      IDENTITY

FIG. 9G

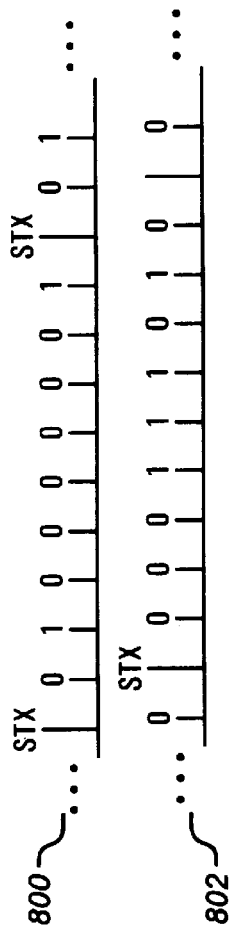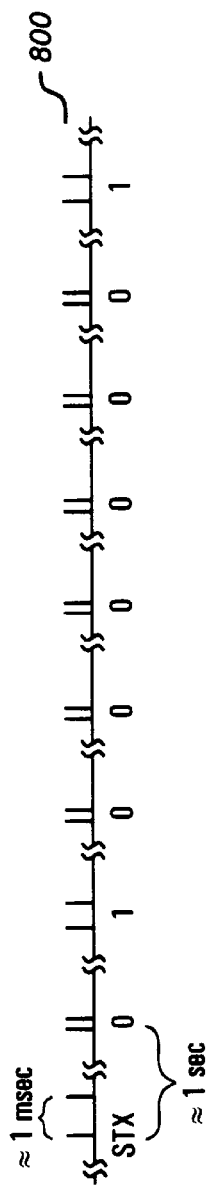
FIG. 11
FIG. 12
FIG. 14

| START OF HEADER (852) | SEQUENCE NUMBER (854) | PACKET TYPE (858) | RECEIVER # (860) | TOA (862) | PULSE MAP |
|---|---|---|---|---|---|
| 0x2 | a |  | EC05 | 377B52 | 7000 |
| 0x2 | a |  | EC03 | 37868F | 7000 |
| 0x2 | b |  | EC05 | 3786F3 | 7000 |
| 0x2 | b |  | EC03 | 379230 | 0180 |
| 0x2 | c |  | EC05 | 379294 | 0180 |
| 0x2 | c |  | EC03 | 379DD2 | 001C |
| 0x2 | d |  | EC05 | 379E36 | 001C |
| 0x2 | d |  | EC03 | 37A96F | 7000 |
| 0x2 | e |  | EC05 | 37A9D4 | 7000 |
| 0x2 | e |  | EC03 | 37B510 | 0180 |
| 0x2 | f |  | EC05 | 37B575 | 0180 |
| 0x2 | f |  | EC03 | 37C0B2 | 7000 |
| 0x2 | g |  | EC05 | 37C116 | 7000 |
| 0x2 | g |  | EC03 | 37CC53 | 7000 |
| 0x2 | h |  | EC05 | 37CCB8 | 7000 |
| 0x2 | h |  | EC03 | 37D7F4 | 7000 |
| 0x2 | i |  | EC05 | 37D859 | 7000 |
| 0x2 | i |  | EC03 | 37E396 | 7000 |
| 0x2 | j |  | EC05 | 37E3FB | 7000 |
| 0x2 | j |  | EC03 | 37EF38 | 7000 |
| 0x2 | k |  | EC05 | 37EF9D | 7000 |
| 0x2 | k |  | EC03 | 37FADA | 7000 |
| 0x2 | l |  | EC05 | 37FB3F | 7000 |
| 0x2 | l | ! | EC03 | 380000 | 0000 |
| 0x2 | m | ! | EC05 | 380000 | 0000 |
| 0x2 | m |  | EC03 | 38067B | 0180 |
| 0x2 | n |  | EC05 | 3806E0 | 0180 |
| 0x2 | n |  | EC03 | 38121D | 001C |
| 0x2 | o |  | EC05 | 381282 | 001C |
| 0x2 | o |  | EC03 | 381DBB | 7000 |
| 0x2 | p |  | EC05 | 381E20 | 7000 |
| 0x2 | p |  | EC03 | 38295D | 0180 |

*FIG. 15A*

| 1ST RECEIVER | TOA | SYMBOL | 2ND RECEIVER | TOA | SYMBOL |
|---|---|---|---|---|---|
| EC03 | 377AED | 0 | EC05 | 377B52 | 0 |
| EC03 | 37868F | 0 | EC05 | 3786F3 | 0 |
| EC03 | 379230 | 1 | EC05 | 379294 | 1 |
| EC03 | 379DD2 | stx | EC05 | 379E36 | stx |
| EC03 | 37A96F | 0 | EC05 | 37A9D4 | 0 |
| EC03 | 37B510 | 1 | EC05 | 37B575 | 1 |
| EC03 | 37C0B2 | 0 | EC05 | 37C116 | 0 |
| EC03 | 37CC53 | 0 | EC05 | 37CCB8 | 0 |
| EC03 | 37D7F4 | 0 | EC05 | 37D859 | 0 |
| EC03 | 37E396 | 0 | EC05 | 37E3FB | 0 |
| EC03 | 37EF38 | 0 | EC05 | 37EF9D | 0 |
| EC03 | 37FADA | 0 | EC05 | 37FB3F | 0 |
| EC03 | 380000 | too wide | EC05 | 380000 | too wide |
| EC03 | 38067B | 1 | EC05 | 3806E0 | 1 |
| EC03 | 38121D | stx | EC05 | 381282 | stx |
| EC03 | 381DBB | 0 | EC05 | 381E20 | 0 |
| EC03 | 38295D | 1 | EC05 | 3829C2 | 1 |

FIG. 15B

LOCATION, IDENTIFICATION AND TELEMETRY SYSTEM USING STROBED SIGNALS AT PREDETERMINED INTERVALS

COPYRIGHT NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

MICROFICHE APPENDIX

A portion of this disclosure of this application contains microfiche appendix which includes one microfiche and 40 frames.

BACKGROUND OF THE INVENTION

1. Field of the Invention

This invention relates to identification, location, and telemetry systems, and more particularly, to a system for positively identifying and receiving telemetry from devices on assets and individuals using reduced power and reduced channel occupancy.

2. Description of the Related Art

Identification, location and tracking systems identify the presence, the absence, or movement of unique devices affixed to people and objects within a predefined area. These systems find increasing application in all areas of automation, accounting, manufacturing, and materials handling areas as well as medical facilities and other areas where real time location ant identification can be critical.

In a typical system, one or more objects or individuals are provided with transmitting devices, commonly known as "TAGs," which can be tracked by an array of receivers in a given tracking area. Each TAG periodically traits a unique digital identification number which is sensed by one or more receivers. The receiver information is then forwarded to a data processing system for storage and tracking. A number of systems have been developed using various techniques, such as radio frequency (RF), and ultrasound for continuously tracking location.

Such systems typically employ radio frequency or ultrasonic based transmitters and sensors. RF systems can provide a high degree of accuracy while maintaining a comparably favorable ratio of range per watt of power. A system using RF tracking methods is disclosed in U.S. Pat. No. 5,119,104 to Heller, which is hereby incorporated by reference. The Heller patent discloses a system which addresses some of the issues associated with RF tracking systems. As disclosed, radio frequency transmissions can be susceptible to interference from multipath reflections, as well as signal attenuation through certain objects which tends to distort the accuracy of the location data. The Heller patent offers a method for incorporating a plurality of receivers and time-of-arrival data to more accurately identify target location.

The Heller patent also offers power conservation by including a motion detector with each TAG transmitter. By transmitting identification information when the target is in motion, but reducing transmissions when motionless, the system can conserve power during motionless periods. The receiving system simply uses the last recorded transmission to identify location. However, one power consumption issue of that system is that if the object is moving, the system of the Heller patent does require higher power consumption for more frequent transmissions.

SUMMARY OF THE INVENTION

The technique according to the invention provides for an abundance of devices present in the same area, with real time supervision for presence and for changes in sensory telemetry. The technique employs transmitters, which use the same carrier frequency, but having a unique identification. The system reduces transmitter power consumption by only transmitting a portion of that identification in any one burst. Thus, the transmitters use miniscule amounts of power but can be detected at long ranges. The system also provides for an antenna that receive signals at the transmit frequency and a signal processor that supervises the devices for presence and for telemetry. The system also provides for antennae that are located at similar points in space that can measure the signal strength of the incident signals in such a way as to determine their approximate sector or angle of reception of the incident signal. Hand-held antennae can be used as "finders", and systems of antennas can be constructed as location grids.

A technique according to the invention provides for transmitting identification, location, and telemetry data while conserving power and increasing available bandwidth. According to the invention, each transmitter identification is split into multiple, smaller, timed transmission packets. The transmitter then transmits a portion of that identification (such as a single bit) periodically, such as once per second. The period of time between transmissions is precise, such that once the system identifies a transmitter, it can then accurately identify the transmitter based upon the next transmission packet's time of arrival. Because of the small bandwidth occupied by and the limited energy used in each single transmission bot the individual transmissions and resulting identifications are resistant to collisions from other transmitters, as well as from noise.

The receiver receives and accurately time-stamps each transmission. This information is then transmitted over a network by sending a map of the received transmission. The received transmission is then processed to identify the device that transmitted and any other data that may have been sent. In one embodiment, the packet is sent over a network that may accommodate other receivers, all feeding a signal processor used for device identification, storage, and/or forwarding of the further processed information.

A signal processor, (currently, a server over an RS-485 bus) receives such packets from all receivers, recognizes identifications from previously "unacquired" transmitters, and maintains information on previously acquired transmitters. From the start of receiving transmissions (or "symbols") that are unexpected or unscheduled, the signal processor establishes an interval from the periodicity of the transmitted symbols. The signal processor attempts to lock onto a transmitter that was newly introduced into the field of the receiver based on the transmission interval. The signal processor does so by correlating the unexpected and unscheduled symbols and calculates a transmission period, or interval. It then predicts times to expect future symbols. As future symbols are received, their additional identification information is accumulated into the system, which both reinforces the algorithm's assurance that future receptions are from a given transmitter and more positively identifies that transmitter. Though the average delay between symbols may vary randomly somewhat or drift, the repeatability of symbols each second (i.e., jitter) is highly accurate. This repeatability allows the system to identify, and infer with an increasingly higher degree of certainty, the presence of a particular transmitter based on its transmission's time of arrival at the receiver.

When an unexpected symbol is first received, the system holds that uncorrelated symbol in a queue, and waits for the transmission of subsequent, associated symbols to establish an interval. Once that interval is established, the signal processor accumulates subsequent transmissions to establish the transmitter's identity. Partial identifications may be used to establish a probable identity. Once associated, approximately or exactly, the signal processor expects subsequent symbols at the predetermined interval. Lack of arrival of expected symbols is tolerated, but with locking lost after a certain number of "missed" symbols. As information packets reflecting subsequent receipts of symbols are detected, the information is added to the identification within the system. If no matching identification appears in the database, the new transmitter data is then added to the database. Once all data bits have been received, the identification of the transmitter is positively known. Successive transmissions of symbols received at known transmission periods allow for tee continuous supervision of the device without the device transmitting the entire identification on every transmission, unnecessarily using the energy and unnecessarily occupying channel space by continuously transmitting that complete identification code.

One advantage of the technique is that once an interval is acquired, the transmitter can be identified based primarily when it transmits, with the actual transmitted symbol verifying the identity of the transmitter. The transmission of a symbol, however, which is only a portion of the identification code, takes a proportionally low amount of power to transmit. For example, assume a system which transmits an identification code once every second requires some predetermined power to transmit. By dividing the identification code into some number of portions and transmitting only one portion every second or so, the disclosed transmitter could require over an order of magnitude less power than the prior system, while maintaining the same transmission, and thus tracking, rate. Particularly advantageous is the immunity of a device's identification to various kinds of noises. A smaller packet containing the "same data" will have a smaller possibility of being lost to noise. Losing data to noise is a function of the time that the data occupies the channel. Therefore, the smaller the data packet, for the same amount of data, the greater the noise immunity. Assume a typical system would take 64 milliseconds to transmit a 64 bit identification packet. Since the disclosed embodiment takes approximately 600 microseconds for each bit, then the noise immunity of transmitting a single bit, rather than 64 bits is increased over 100 times, providing 20 db more noise immune.

Prior systems could reduce power by transmitting less frequently, but that would cut down on the ability of the system to supervise the presence of a "TAG", or device, in real time as well as obviating the practical use of an antenna for "finding" the device. Once again, by using the disclosed techniques, the present system has longer life on the same battery, has an abundance of devices that can exist in the same area, provides a high tracking rate, and has greatly increased immunity to noise. Noise immunity occurs for all forms of noise, including other like devices' transmissions, other same frequency but dissimilar transmissions, and man-made and more natural Gaussian, Schott and impulse noise.

Further, when an antenna receives a transmission by a particular device, it encodes the received data in such a way that future changes in both transmission format and system parameter do not require modifications of the antenna. Specifically, rather than deciphering the meaning of a particular transmission, a receiver encodes the received transmission as a "pulse map" of energy received in distinct packets of time. This pulse map can be set to a variety of lengths depending on the particular data transmission formats used. For example, a startup transmission "symbol" may be a pulse followed by a particular silent period followed by a second pulse; a "1" identification bit could be a start pulse followed by a second interval and then a second pulse; and a "0" bit could be a start pulse followed by yet a third interval and then a second pulse. If it is desired to have multiple identification bits, or additional data to be appended to that initial data, the pulse map could be extended until data is not received, or multiple pulse maps could be sent for a string of data. But by mapping the received pulses as a map, rather than deciphering their meaning them at the antenna, the antenna maintains a great deal of flexibility without having to know the exact protocols of a particular implementation. The received data is transmitted in the form of pulse maps along with time stamps and other information over the network to the signal processor, which processes the maps, identifies transmitters, accumulates data associated with the transmissions, and otherwise monitors all transmitters within the range of the system.

BRIEF DESCRIPTION OF THE DRAWINGS

FIGS. 2A–2C are illustrations of transmissions of identifying data according to one embodiment of the invention;

FIGS. 9A–9G are illustrations of data structures used in the signal processor according to the invention;

FIGS. 11 and 12 are timing diagrams illustrating a transmission format of another embodiment according to the invention;

FIG. 14 is a block diagram illustrating pulse mapping interpretation according to the invention;

FIGS. 15A and 15B are tables illustrating the interpretation of data by the signal processor according to the invention;

DETAILED DESCRIPTION OF THE PREFERRED EMBODIMENT SYSTEM OVERVIEW

Figure 1:
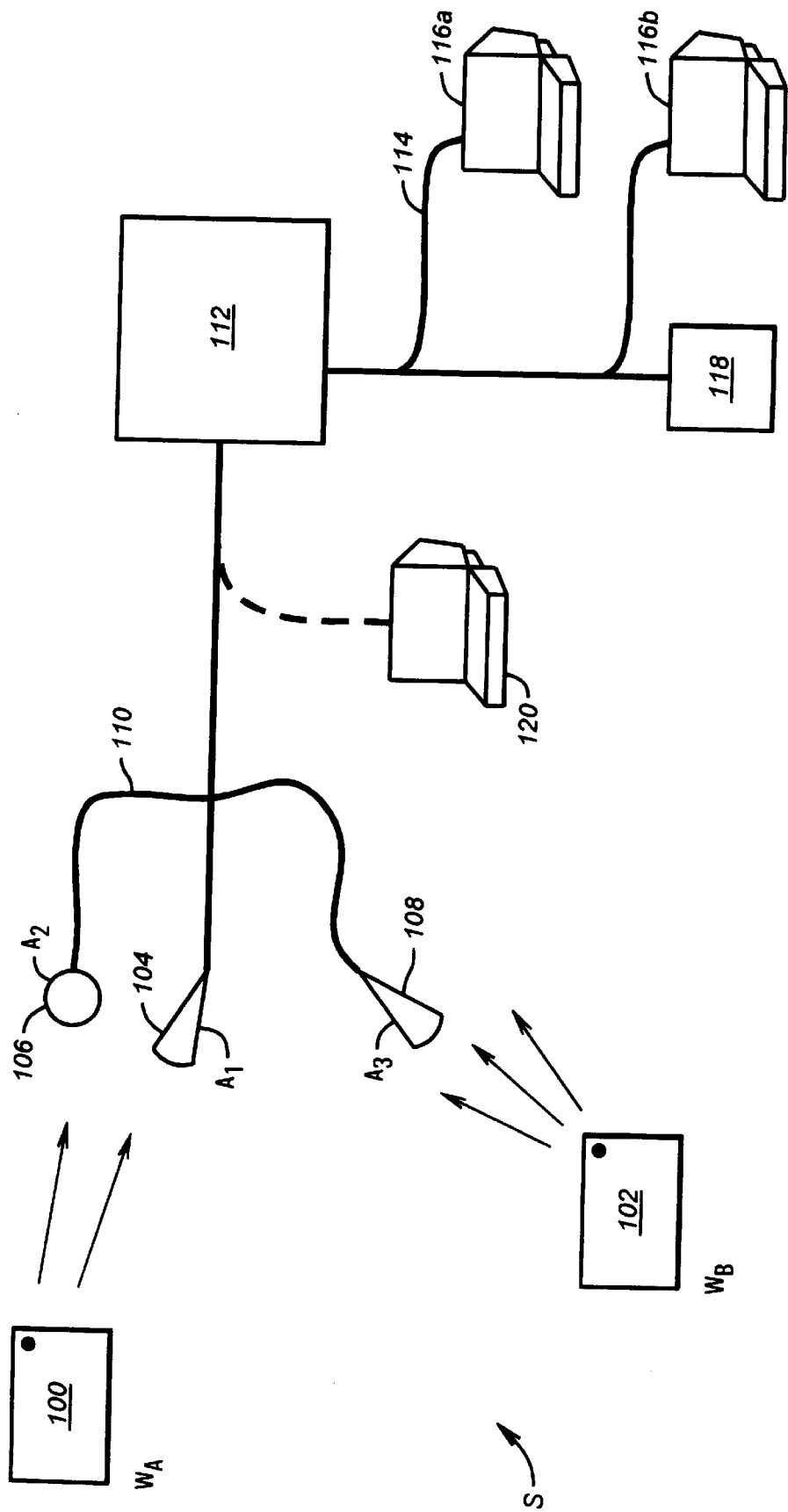
FIG. 1 is a block diagram illustrating a tracking system implemented according to the invention.

Turning to FIG. 1, shown is a block diagram illustrating a presence detection and identification system S according to the invention. In the shown system S, a wireless transmitter $W_A$ 100 and a wireless transmitter $W_B$ 102 each transmit identification information along with data. As is further described in detail below, the identification information is generally not transmitted as a single periodic burst of data. Instead, the transmitters $W_A$ 100 and $W_B$ 102 separate their identification data into a series of components, which are individually transmitted periodically over time.

These transmissions are received by one or more directional or non-directional antennas $A_1$ 104, $A_2$ 106 and $A_3$ 108. These antennas 104, 106 and 108 are preferably coupled to a network 110 and timestamp each received transmission from one of the transmitters $W_A$ 100 or $W_B$ 102. The antennas 104, 106 and 108 transmit both the timestamp and the corresponding received data to a signal processor or other controller 112. The signal processor 112 is connected to a second network 114, which provides the information gathered by the signal processor 112 to various work stations 116a and 116b, or to other devices 118, such as a phone system controller. Alternatively, or in connection with the system S of FIG. 1, work stations and devices 120 can be connected to the network 110, where the network 110 could be a standard Ethernet or other type of local operating network (LON), local area network (LAN), or wide area network (WAN).

The transmissions from the wireless transmitters $W_A$ 100 and $W_B$ 102 are of a particularly advantageous format. Specifically, these transmitters $W_A$ 100 and $W_B$ 102 can have 64-bit identification values that uniquely identify each transmitter 100 or 102. In typical previous systems, this identification was transmitted in a single burst, alone or along with telemetry (such as a button push), which was then received by antennas. The transmitter identification was then immediately known if the packet was received without a collision. The packet may have contained error detection logic, such as parity, CRC, or forward correcting codes, but even so, a collision could prevent positive identification.

For real-time location purposes, there is a tradeoff between the frequency of transmission and bandwidth of the area (the number of devices in the area). For applications where an increase in the real-time location capability was desired, system tradeoffs included:

1. an increase in cost and size of battery,
2. an increase in cost of receiver to increase the bandwidth (hence reducing the time of transmission),
3. a limit to the number of devices in the area,
4. a reduced number of unique identification numbers (because fewer bits of identification data reduced power requirements), or
5. addition of a receiver to the tag so that the device will only "transmit" when commanded.

These tradeoffs increase the devices complexity and cost, so previously the periodic transmission interval would be increased until all the design requirements could be satisfied. Often marketing research and prototype testing could lead to a reasonable solution, but the system would be limited by these parameters in future applications. With these settled parameters, the manufacturer would be required to make products according to those predefined parameters.

As further demonstration of the tradeoffs regarding real time location capability, if a transmitter transmitted ten times a second, for most applications the real time location of the transmitter would be considered excellent. However, with similar devices passing under the same sensor, the increased transmission rate would lead to a greater number of collisions. A 50 millisecond identification transmitted every 100 milliseconds would occupy 50% of the bandwidth of a receiver. To the receiver trying to capture one of the transmitters, another would appear as noise and hence create havoc for the reception of the other TAGs identification. By decreasing the number of unique identification numbers (less bits to transmit) the system would occupy less bandwidth, but with reduced flexibility and future expansion capabilities.

To improve battery life, prior systems have implemented techniques such as motion sensors for adjusting the period between transmissions up for less active or nonmoving TAGs. According to the invention, however, the transmitter can transmit at relatively high powers, relatively frequently, and with extended battery life. This is achieved by transmitting only a portion of the identification from each transmitter $W_A$ 100 or $W_B$ 102 at a periodic interval. Thus, instead of transmitting the entire identification in one burst, the transmission of the identification is spread out over, for example, a period of thirty seconds to one minute.

The transmission of symbols (a portion of the identification data), however, occurs once a second, for example. Further, the period between each transmission is repeatable over several seconds such that the intelligent signal processor 112 can predict and schedule the next expected transmission. When received within the predicted scheduled time, the system then knows with a high degree of confidence which device transmitted that information. Following the collection of some or all of the identification code, the signal processor 112 can then associate that identification with each single symbol it predictably receives.

Using this protocol, the system may take several symbols to initially determine that a unique device is responsible for repeatable intervals of symbols and begin to accumulate the full identification. Algorithms discussed below match "recently seen TAGs" to fragments of identifications that the signal processor receives. From this information, the signal processor infer the actual identification prior to the identification number's complete.

THE TRANSMISSION PROTOCOL

Turning to FIGS. 2A and 2B, various details of one data format transmitted by the wireless transmitters $W_A$ 100 and $W_B$ 102 are shown. FIG. 2A illustrates a wireless identification number (WIN) that is associated with each of the transmitters $W_A$ 100 and $W_B$ 102. Specifically, a $WIN_A$ 150 is shown to be a 64-bit hexadecimal value 64'h02468ACE02468ACE, while a $WIN_B$ 152 is shown to be a hexadecimal value 64'h13579BDF13579BDF. The $WIN_A$ 150 is transmitted as the identification of the wireless transmitter $W_A$ 100, while the $WIN_B$ 152 is transmitted as the wireless identification number of the transmitter $W_B$ 102. Although the $WIN_A$ 150 and the $WIN_B$ 152 are shown to be repeating numbers, generally they will be seemingly random to one another as a function of their manufacture date and other parameters, and are unlikely to have consecutive identical values.

Concerning how these identification values are transmitted, referring to FIG. 2B, a typical transmission sequence for the 64-bit $WIN_A$ 150 is shown. For example, the 64-bit identification value is divided into a series of sixteen, 4-bit nibbles. These nibbles are then transmitted in the intervals approximately one second apart. Referring to FIG. 2B, in a first period 154, for example, the first nibble (4'hO) is transmitted in a burst over a period of time $t_{A1}$ 154 then, a second nibble is transmitted during a period $t_{A2}$ 156, which begins $T_{A1}$ period of time later.

Preferably, the period $t_{A1}$ is orders of magnitude less than the length of time $T_{A1}$. For example, the period $t_{A1}$ could be 500 microseconds, while $T_{A1}$ is one second, yielding a duty cycle and a same channel occupancy of less than 0.05%. Further, the first nibble is transmitted using a symbol 164, of which there are seventeen in the disclosed embodiment, sixteen for the four nibbles and one for a header value. Symbols are discussed further below in conjunction with the transmission format of the transmitters $W_A$ 100 and $W_B$ 102.

The period between transmissions $T_{An}$ tends to be much larger than the transmission period $t_{An}$ itself. Further, while the symbol 164 is transmitted as a portion of the $WIN_A$ 150, data 166 can also be appended to the transmission. Thus, some transmissions may be longer than others because of this additional data 166, having a period $t_d$. The reception of symbols and data is the domain of the receiver. Both symbols and data are short as compared to $T_{An}$ and entirely detected by the receiver. The symbol and data are time stamped and sent the signal processor 116 for its determination of:

1. which device transmitted it,
2. an accumulation of the new data with prior data from the same device,
3. a predication or scheduling of the next symbol that it may receive and forwarded as programmed by the user or an applications program based on the event of a symbol arriving, and
4. the newly obtained TAG identification in the area or a change in the telemetry that came in as data.

Turning to FIG. 2C, it will be appreciated that the amount of energy necessary to transmit the $WIN_A$ 150 according to the disclosed embodiment is lower than if the $WIN_A$ 150 were transmitted in its entirety at each of the periodic transmissions 154–162. Shown in FIG. 2C is a series of transmissions 168 by the wireless transmitter $W_A$ 100 and a series of a transmissions 170 by the wireless transmission $W_B$ 102. The series of transmissions 168 are continuous transmissions separated by the period $T_{A1}$, with a header symbol being transmitted followed by a transmission of a symbol for (0), then (0), then (1), etc. making up the $WIN_A$ 150. In this disclosed embodiment, each symbol is repeated twice to assist the system of FIG. I in determining which transmitter is transmitting a particular sequence of symbols. According to the invention, however, this is not necessary—instead, the $WIN_A$ 150 can be transmitted as a sequence of changing symbols making up the entirety of the $WIN_A$ 150, without repeating each symbol. Such an embodiment is discussed below in conjunction with FIGS. 11–15B.

It can be assumed that a certain amount of energy is necessary to transmit a certain amount of data. Because during each of the periods $T_{An}$ only 4 bits of data are being transmitted rather than 64 bits, the energy used for such a transmission is thus reduced. At the same time, the period $T_A$ is sufficiently short to provide suitable tracking of an object or person that is moving. In this way, and by transmitting only portions of the $WIN_A$ 150 in each period, power consumption is reduced without reducing the periodicity of the transmission, and thus without reducing the real time detectability of the wireless transmitter $W_A$ 100.

RECEPTION OF WINs

Figure 3:
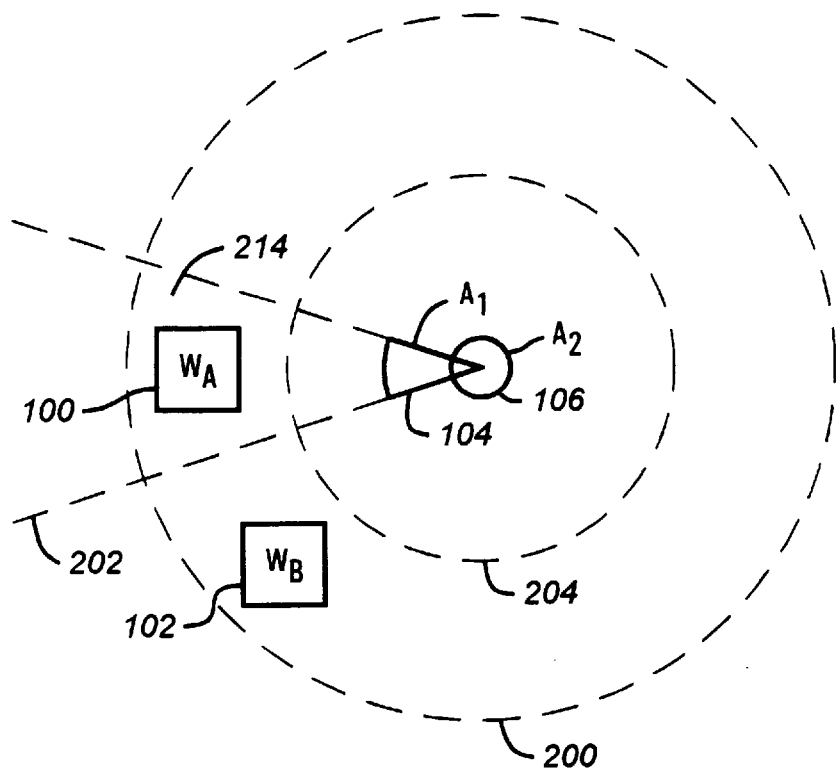
FIG. 3 is a diagram illustrating potential antenna reception patterns according to the invention.
Figure 4:
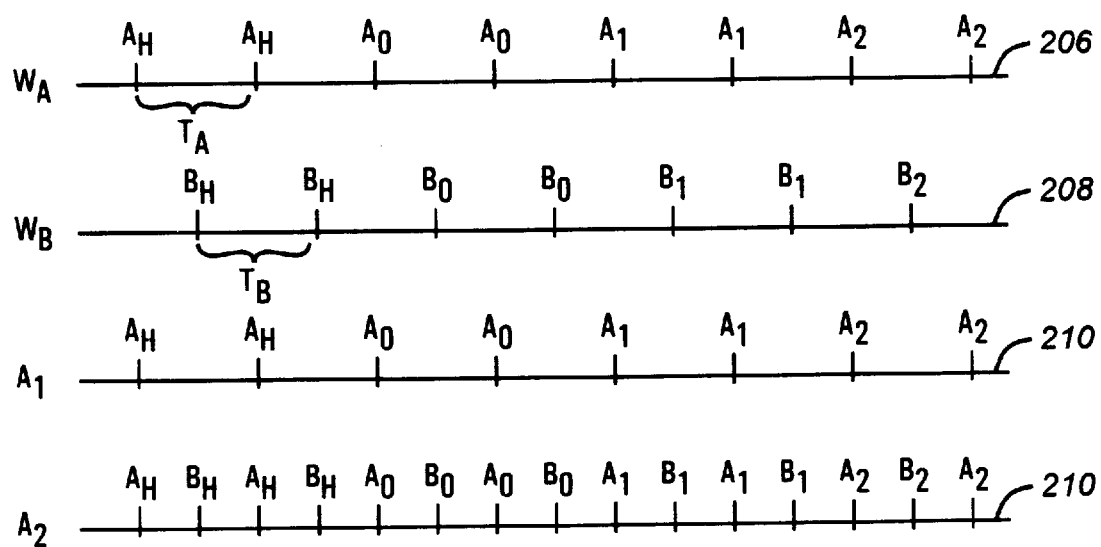
FIG. 4 is a diagram illustrating the timing of transmitted and received signals according to one embodiment of the invention.

Turning to FIGS. 3 and 4, illustrated are an antenna system employing the antennas $A_1$ 104, $A_2$ 106 and $A_3$ 108 to track the presence and location of wireless transmitters $W_A$ 100 and $W_B$ 102. It is assumed that $A_2$ 106 is an omni-directional antenna while $A_1$ 104 is a directional antenna. The transmitter $W_A$ 100 is shown to be within an extended range 200 of the omnidirectional antenna $A_2$ 106, as well as within an angular range 202 of the directional antenna $A_1$ 104. $W_B$ 102, in contrast, is only within the range of the omnidirectional antenna $A_2$ 106. The omnidirectional $A_2$ 106 is also shown to have a reduced range 204, which by employing signal strength monitoring can further be used to locate the transmitters $W_A$ 100 and $W_B$ 102. Turning to FIG. 4, shown are a transmission sequence 206 that is transmitted by the wireless transmitter $W_A$ 100, and a transmission sequence 208 that is transmitted by the wireless transmitter $W_B$ 102. The transmission 206, as discussed above in conjunction with FIG. 2C, can include a series of nibbles of data in the form of symbols, with each once repeated for ease of identification and matching of subsequent symbols with a previous symbol. Alternatively, the data can be single bits, as discussed below, in conjunction with FIGS. 11–15B. In the transmission 206, a header symbol is transmitted twice, followed by the symbol reflective of the first nibble of the $WIN_A$ 150, then the second nibble of the $WIN_A$ 150, followed by the third nibble of the $WIN_A$ 150, etc. The transmitter $W_B$ 102 transits a header symbol twice, again followed by a symbol reflected with the first nibble of the $WIN_B$ 152, then the second nibble of the $WIN_B$ 152, etc.

It should be remembered that the transmission 206 by the transmitter $W_A$ 100 and the transmission 208 by the transmitter $W_B$ 102 are in general decoupled from each other. Although they are shown being interleaved, and both starting with a header symbol, in general the transmissions 206 and 208 will be randomly related, drift with respect to each other, and may even collide at particular times. The interrelationships of FIG. 4 are simply shown for illustrative purposes of what a particular antenna would receive.

The antennas $A_1$ 104 and $A_2$ 106 receive these transmissions 206 and 208, or some portion of these transmissions 206 and 208. The antenna $A_1$ 104 receives a series of transmissions 210, which are simply the transmitted symbols of the wireless transmitter $W_A$ 100 transmitted in the transmission sequence 206. The transmission sequence 208 is not received because the transmitter $W_B$ 102 is not within the range of the antenna $A_1$ 104. In contrast, the antenna $A_2$ 106, which is omnidirectional, receives a transmission sequence 212, which is shown to be the combined transmissions 206 and 208 of the transmitter $W_A$ 100 and $W_B$ 102. The header symbol of the transmitter $W_A$ 100 is received, followed by the header symbol of the transmitter $W_B$ 102, and the sequence continues to alternate. As illustrated by the transmission sequence 212, it will be appreciated that because of the very low duty cycle of the transmissions (200 microseconds on, 1 second off), the chances of a collision are very low.

Referring back to FIG. 3, it will be appreciated that the antenna $A_1$ 104 sends data packets over the network 110 indicating the time of arrival of each of the transmissions from transmitter $W_A$ 100. Those data packets can include data indicative of the signal strength of the transmitter $W_A$ 100. If such is the case, the system S of FIG. 1 can determine not only that the transmitter $W_A$ 100 is within the angle of reception 202 of the antenna $A_1$ 104, but also a particular area 214 within which that particular signal strength would be present. This would be determined by a signal strength indication added to the packet of data transmitted over the network 110 by the antenna $A_1$ 104 and by the antenna $A_2$ 106.

Figure 5:
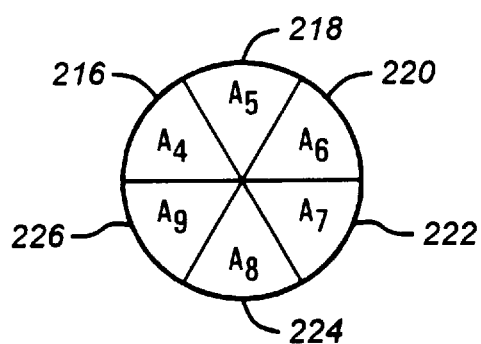
FIG. 5 is a block diagram illustrating a multi-directional antenna implemented according to the invention.

Further, it will be appreciated that rather than simply having an angled antenna $A_1$ 104, a multi-directional antenna can be provided which include six independent antennas as illustrated in FIG. 5. As illustrated in FIG. 5, the antenna is provided with six independent antennas, $A_4$ 216 through $A_9$ 226. Using such a sectored antenna, the entire periphery as illustrated in FIG. 3 can be divided up into sectors. If an antenna is located in a corner of a room, one could instead sector the room into multiple subsectors without having a full 360° angle of reception.

Figure 6:
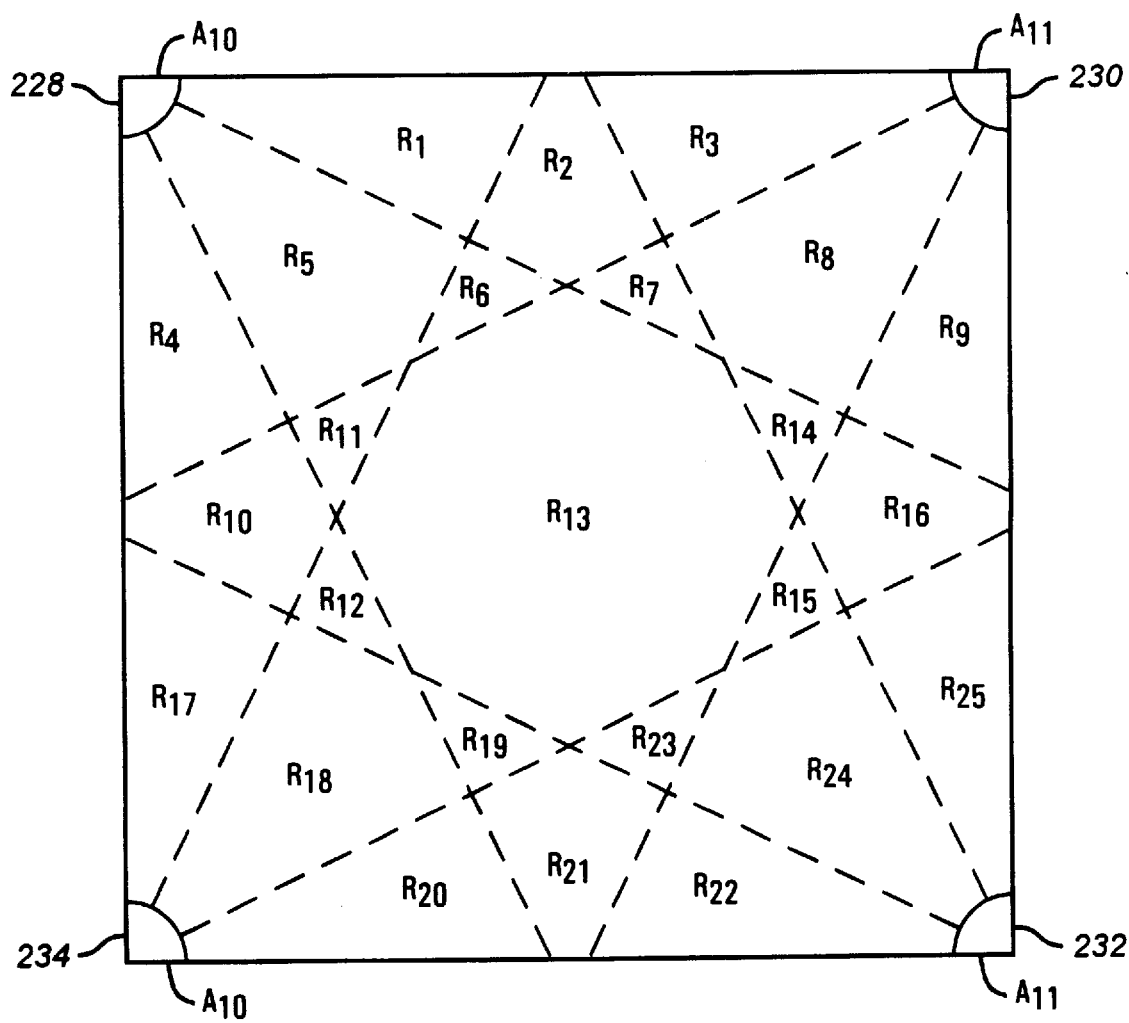
FIG. 6 is a block diagram of a room illustrating antenna reception patterns according to the invention.

A wide variety of antenna configurations is possible, and by suitably selecting the configuration, objects can be located by the intersection of the reception areas of the various antennas. Referring to FIG. 6 for example, shown is a room with four antennas $A_{10}$ 228, $A_{11}$ 230, $A_{12}$ 232 and $A_{13}$ 234 in each of the corners of the room. Each antenna includes three "sub-antennas", thus effectively dividing the room into three regions for each antenna. Employing these four antennas $A_{10}$ 228 through $A_{13}$ 234, the room can be broken up into twenty-five regions $R_1$ through $R_{25}$. In this way, by employing intersections of the regions covered by each of the antennas 228 through 234, the location of a transmitter $W_A$ 100 or $W_B$ 102 can be precisely determined based on which antennas are receiving a signal from those transmitters 100 or 102 and which are not. Note that even further accuracy in identifying the locations of each of the transmitters $W_A$ 100 or $W_B$ 102 can be achieved by employing signal strength to determine the distance of the transmitter from a particular antenna $A_{10}$ 228 through $A_{13}$ 234.

DATA FLOW

Figure 7:
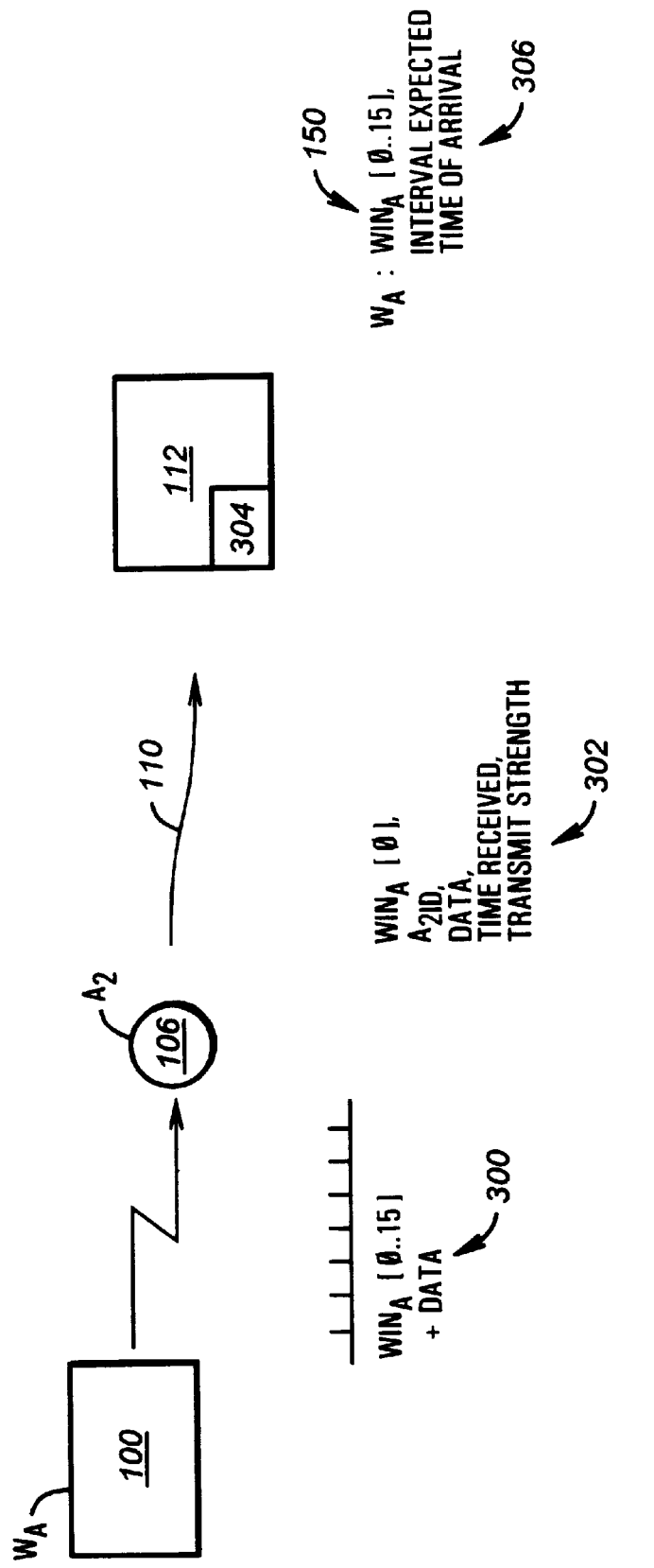
FIG. 7 is a flow diagram illustrating the transmission of data from a transmitter to an antenna over a network and to a central server to process the data.

Turning to FIG. 7, a sample of the data flow in the system S of FIG. 1 is illustrated. Specifically, shown is exemplary data flow from the wireless transmitter $W_A$ 100 to one of the antennas $A_2$ 106, then over the network 110 to the signal processing server 112. Over a period of time, the wireless transmitter $W_A$ 100 periodically transmits identification $WIN_A$ 150, along with any additional data that may be desired, such as motion status or temperature. This results in a series of data packages 300 transmitted in short bursts, together forming $WIN_A[0 \ldots 15]$, which is 16, 4-bit nibbles forming $WIN_A$ 150.

The first of these pulses containing $WIN_A[0]$ is received by the antenna $A_2$ 106. This antenna is a "smart" networked antenna. It includes a relatively stable clock to provide a timestamp for time of arrival. It also includes its own identification $A_{21D}$ and, preferably, can determine the signal strength of the data 300 transmitted by the wireless transmitter $W_A$ 100. After receiving the first pulse from $W_A$ 100, the antenna $A_2$ 106 forms a packet of data 302, which includes the portion of the $WIN_A$ 150 transmitted in the first burst by the transmitter $W_A$ 100, includes the antenna identification $A_{21D}$, includes any associated data, includes the timestamp of TOA (i.e., time of arrival), and includes an indication of transmit strength. The format of this data can be varied, and items such as the antenna ID $A_{21D}$ could be in an object ID format as described in U.S. Pat. No. 5,572,195, issued Nov. 5, 1996, entitled Sensougard Control System for Local Area Networks, which is hereby incorporated by reference.

Further, rather than transmitting deciphered data as the packet of data 302, the antenna $A_2$ 106 can instead transmit a "pulse map" of the received data as is discussed below in conjunction with FIGS. 11–15B. This allows for different transmitters to be provided in the system with different transmission formats without the need to modify the software, the antenna $A_2$ 106. The received data and transmit strength could also be similarly "pulse" and "amplitude" mapped.

Such a package of data 302 is transmitted by the antenna $A_2$ 106 for each burst of data received from the wireless antenna $W_A$ 100. The package of data 302 is transmitted over the network 110 to the server 112. Because the antenna $A_2$ 106 stamps the data with a time of arrival, transmission latency over network 110, as long as it is not highly excessive, will have little effect on the operation of the system. The server 112 is then running software 304 which receives the packets from the various antennas $A_1$ 104, $A_2$ 106, and $A_3$ 108, as well as other antennas and potentially touch-sensitive receivers as well. The software 304 employs a digital signal processing algorithm described below to identify, locate, and track the various wireless transmitters. Specifically, a data table is created containing, for each transmitter such as $W_A$ 100, the identification number (WIN), a calculated transmit interval, and an expected time of arrival of the next transmission. Then, when the server 112 receives a packet such as the packet 302 that has a time of arrival stamp that falls within an expected time of arrival, the server 112 can compare the portion of the WIN within that packet to the expected next portion of the WIN as defined by the data item 306. If they match, it can be deduced with a high degree of certainty that the packet was in fact transmitted by the transmitter $W_A$ 100.

At this point, it is instructive to understand that the data formats and transmission intervals can be varied in different embodiments. For example, although FIG. 2C illustrates a transmission format in which each nibble of the transmission is repeated, that is done to assist the software within the server 112 to determine when two successive nibbles are being transmitted by the same transmitter $W_A$ 100 or $W_B$ 102. Instead, by employing an intelligent algorithm (described below) within the server 112, the nibbles need not be repeated as shown in FIG. 2C, but instead the software 304 within the server 112 can determine when successive symbols are transmitted by the same transmitter $W_A$ 100 or $W_B$ 102 based on the intervals between transmissions. If the intervals are fixed, for example, if a sequence of three transmitted symbols has two identical periods $T_N$ between the transmissions, it can be determined with a high degree of certainty that the same transmitter $W_A$ 100 or $W_B$ 102 is transmitting the symbol. This is because the "jitter" between consecutive transmission periods is preferably very low.

Figure 8:
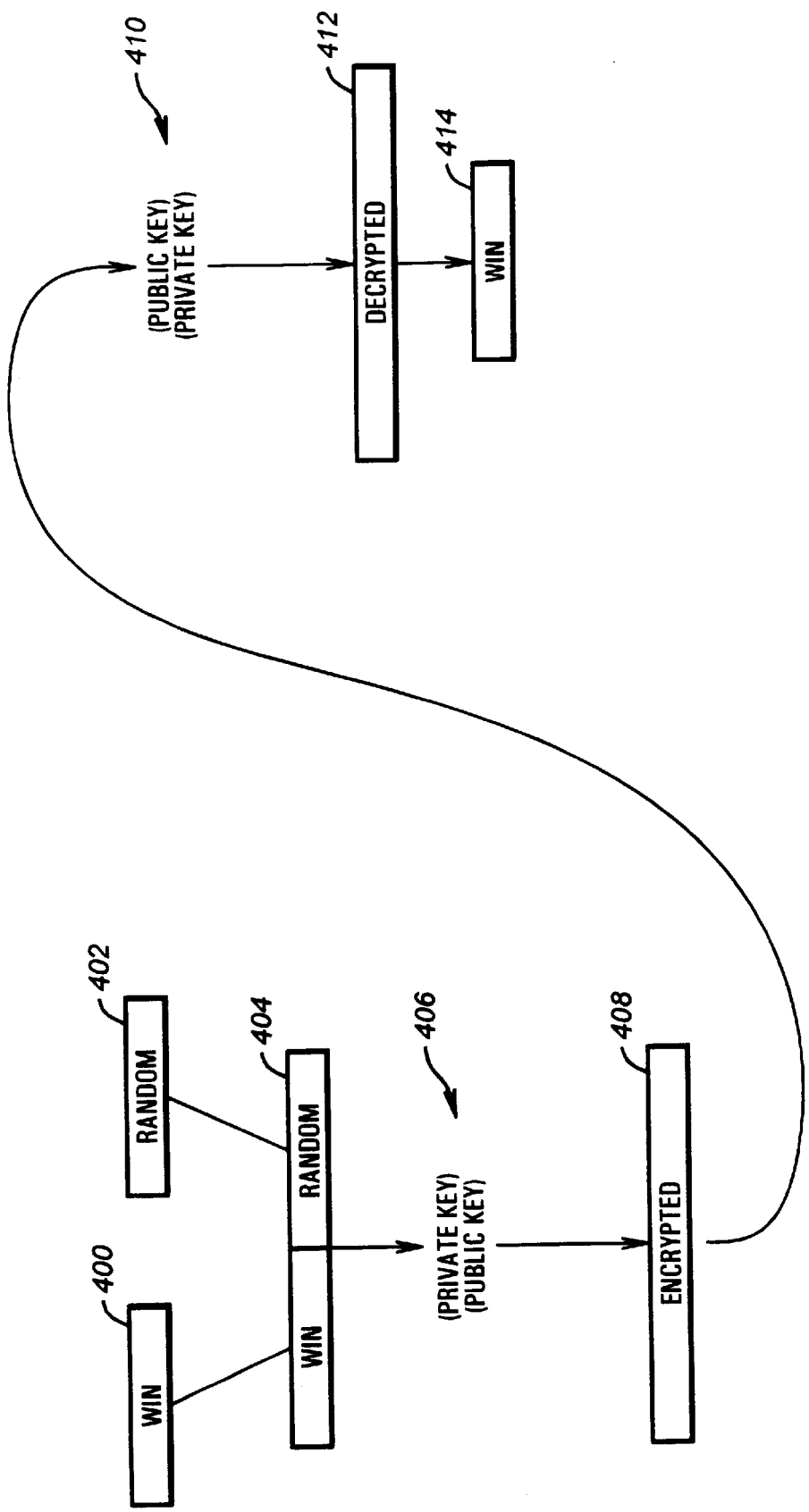
FIG. 8 is a block diagram illustrating the encryption and authentication of data transmitted by a transmitter according to the invention.

Further, although as shown in FIGS. 2A–2C the $WIN_A$ 150 or $WIN_B$ 152 is broken up into a sequence of nibbles, it could instead be encoded, encrypted, digitally signed, or otherwise re-arranged. This is illustrated in FIG. 8, where a WIN 400 is combined with a random value 402 (which could instead be a sequential counter to eliminate the transmission of unneeded, random data). This yields combined data 404, which is then passed both through a public key and a private key algorithm 406. This algorithm encrypts the data 404 with a public key known to the server 112, and encrypts the data 404 with a private key unique to the transmitter $W_A$ 100 or $W_B$ 102. As is known in the encryption arts, this has the effect of both digitally signing and digitally encrypting the data 404. This results in signed and encrypted data 408, which is transmitted through the antenna such as the antenna $A_2$ 106, over the network 110, and to the server 112. Within the server software 304, a public key and private key corresponding to the private key and public key used in the algorithm 406, are employed in a step 410, where the private key encryption of step 406 is reversed using the public key associated with the transmitter $W_A$ 100, and the public key encryption of step 406 is decrypted with a private key associated with the server 112. In this way, the data is authenticated by the private key/public key combination and decrypted with the public key/private key combination. This decrypted authenticated data 412, once fully gathered in a sequence of transmissions, is then stored as the data 306 within the server 112, yielding a wireless identification number WIN 414. But again, even though the data 404 is encrypted and signed in a step 406, that encrypted signed data 408 is still divided into a sequence of symbols which are transmitted in a series of bursts as illustrated in FIG. 2C. That is, all of the data forming the encrypted data 408 is in general transmitted in a series of descrete transmissions, such that the server 112 first receives a series of packets 302 over a period of time before it can identify the transmitter $W_A$ 100 or $W_B$ 102 with certainty.

Preferably, the "random" number 402 is actually a sequential counter that is incremented for each series of packets containing a WIN. By employing a sequential counter, it is ensured that over time, encrypted data item 408 will be different. This way, an eavesdropper cannot capture a series of bursts that together form all of the identification data of a transmitter and then retransmit that, "spoofing" the transmitter. This is because the software 304 will expect a next sequential number 402, rather than a previously transmitted number, and will thus know that the "spoofed" transmission is invalid.

Referring back to FIG. 7, many variations are possible. For example, within the data 306, an interval is stored which corresponds with a particular transmitter's interval $T_N$ as is illustrated in FIG. 2B. Although this interval is shown as being fixed, it will be appreciated that the interval is more generally arbitrary, rather than necessarily fixed. For example, a known, pseudo-random offset can be added to each succeeding interval $T_N$ so that two transmitters will not become in "lock step" and continuously collide. This pseudo-random offset could be based on a variety of values. For example, the offset of the interval for the next transmission could be a hash function or other function of the random (or counter) number 402 as illustrated in FIG. 8. Then, when the server software 304 receives both the WIN 400 and the random number (or counter) 402 as illustrated in FIG. 8, it can calculate a series of next intervals $T_N$ for the next sequence of transmissions of the encrypted WIN. Alternatively, it is possible to base the "random" offset on the symbol that was last transmitted by the transmitter $W_A$ 100. Because each transmitter has its own unique WIN, such as the $WIN_A$ 150 or the $WIN_B$ 152, and because the succeeding symbols in general differ among the transmitters, by providing that the next interval will have an offset based on the particular symbol transmitted in the current transmit period (such as the transmit period 154, FIG. 2B), a "pseudo-random" interval can be determined to adjust the expected time of arrival of the next transmitted symbol. Although "pseudo-random," the offset is both arbitrary and deterministic, in that the server 112 can calculate based on previous transmissions what that next "pseudo-random" offset will be.

Further, it will be appreciated that although the wireless transmitters $W_A$ 100 and $W_B$ 0102 should have low unanticipated "jitter" between subsequent transmission periods (such as the period $T_{A1}$ and $T_{A2}$, see FIG. 2B), it will not adversely affect the operation of the systems if over time period $T_N$ drifts. This is because the server 112 can compensate for slight drifts over time by adjusting the determined interval within the data 306. This is particularly advantageous, because it is fairly simple to construct a transmitter that has little jitter between subsequent transmissions, but a change in temperature or operational characteristics of components will often cause drift of transmission periods over time.

Also, while it might be difficult to synchronize the clocks within the antennas $A_1$ 104, $A_2$ 106 and $A_3$ 108, this is not strictly necessary as long as the clocks do not have much jitter themselves. This is true because the server 112 and its software 304 can normalize all the antennas $A_1$ 104, $A_2$ 106 and $A_3$ 108 to a single time base. This is done when two of the antennas, such as $A_1$ 104 and $A_2$ 106 both receive a transmission by a single transmitter such as $W_A$ 100. In that case, that transmission can be used as a reference point for the clocks for both of the antennas, with an offset between the two antenna clocks calculated by the server 112. Over time, the clocks speeds can similarly be scaled, such that the relationship of the clocks within the antennas $A_1$ 104, $A_2$ 106 and $A_3$ 108 are ultimately correlated to a high degree of precision within the server 112.

SERVER SOFTWARE

Referring to FIGS. 9A–9F, shown are various data items employed by the server software 304 discussed below in conjunction with FIG. 10. Turning to FIG. 9A, shown is an EVENT data item 500, which is transmitted over the network 110. This data item 500 is essentially a packet of data transmitted by an antenna that has received a transmission from a transmitter. As illustrated, the EVENT data item 500 includes five elements in the disclosed embodiment, a SYMBOL item, an ANTENNA_ID item, a DATA item, a TOA (time of arrival) item, and a SIGNAL_STRENGTH item. As discussed previously and below, this data item could instead include pulse maps rather than he SYMBOL item and the DATA item, and then the pulse maps can be deciphered by the signal processing server 112 rather than at one of the antennas.

The SYMBOL item is the nibble that has been received as a symbol by one of the antennas, such as the symbol 164 of FIG. 2B. It is indicated that the SYMBOL can be up to 64 bits, however. This would be for implementations in which it is desired to at some times transmit an entire identification at one time. For example, the wireless transmitter $W_A$ 100 could employ the low power, split emission of the $WIN_A$ 150 in normal operation, but could also include a physical touch port that would allow the wireless transmitter $W_A$ 100 to actually be used as a "key". By touching the physical touch port of the wireless transmitter $W_A$ 100 to a receiver port, it would then be desirable to immediately transmit the entire ID. In such an instance, the SYMBOL data item would actually include all 64 bits (i.e., 16 symbols worth) of the identification data, or WIN, of the wireless transmitter. In such a circumstance, the ANTENNA_ID field would include a sensor identification value.

The ANTENNA_ID field is shown to be a 16-bit value. It could be more or less, however, an it could employ an object ID technology as described in the previously incorporated U.S. patent entitled Sensory and Control System for Local Area Networks. In any case, the ANTENNA_ID field identifies the particular antenna or sensor which has received the data, such as the antennas $A_1$ 104, $A_2$ 106 and $A_3$ 108 of FIG. 1.

The DATA field could include any associated data (such as the data 166 of FIG. 2B) transmitted on the particular transmission, here shown to be between 0 and 256 bytes. Typically, a data transmission associated with a symbol transmission would include a header value that indicates the amount of data to be transmitted, followed by the data itself. Preferably, large amounts of data that are transmitted via wireless transmission would be split up among transmission periods such as the transmission periods 154–162 of FIG. 2B, so that if there is a collision involving any particular packet of data, only a portion of the transmitted data is invalid.

The TOA field is shown to be 32 bits. It again could be larger or smaller. Further, the time of arrival field is preferably the value transmitted by the antenna/sensor, but could be normalized upon receipt to a common time-base before it is stored as discussed above. In any case, because the antenna/sensor is known, the TOA can at some point be normalized to a common time base for the server 112 in the systems as discussed above.

A SIGNAL_STRENGTH field shown to be 8 bits to indicate relative minimal and maximal strength between 256 values. The SIGNAL_STRENGTH field is preferably set within an antenna by sensing the signal level of the received transmission.

While the EVENT item 500 preferably reflects each received burst transmission by an antenna, this could mean that multiple EVENT items will be received for each signal transmission if more than one antenna has received that item. For example, if the three of the antennas $A_1$ 104, $A_2$ 106 and $A_3$ 108 all receive a transmitted symbol, three EVENT items will be generated from three packets of data. These three EVENT items are then stored in a queue until they can be processed by the software 304. The software 304 will either normalize the TOA field of the received EVENT item based on the ANTENNA_ID field, or can wait to normalize the TOA field when the EVENT item is processed.

In either case, for purposes of identifying a particular transmitter such as the transmitter $W_A$ 100 or $W_B$ 102, the software 304 normalizes the three EVENT items to a single time of arrival and a single symbol, which are stored as a SINGLE item 502 within a SINGLES_TABLE 504. Alternatively, the software 304 can normalize the three EVENT items to three SINGLE items 502, each reflecting a different received packet. In that case, it is preferable that the SINGLES item 502 further include an ANTENNA_ID item (not shown) so that the software 304 can appropriately determine which antenna a particular SINGLES item 502 is associated with.

The SINGLES item 502 includes a 4-bit SYMBOL item, which reflects the particular symbol transmitted by a particular transmitter in the system, and its associated time of arrival (TOA), the 32-bit value normalized to a common server 112 time base.

These SINGLES items 502 are stored in a SINGLES_TABLE 504 of FIG. 9C. The SINGLES_TABLE 504 is an array of SINGLE items 502. Although shown to contain 16 data items, this is more of a function of how many transmitters are expected within the system S, how widespread the system S is intended to be, and the processing power of the server 112. The SINGLES_TABLE 504 is employed by the software 304 to determine when subsequent symbols are being received from the same wireless transmitter such as $W_A$ 100, and then to positively identify that transmitter such as $W_A$ 100.

Specifically, for the various single transmissions in the SINGLES_TABLE 504, a list of possible pairs of symbols is generated and formed into a data table SINGLE_INTERVAL_TABLE 506, illustrated in FIG. 9D. The SINGLE_INTERVAL_TABLE 506 is an array of POSSIBLE_PAIR data items, which are of a type PAIRS 508, illustrated in FIG. 9E. Each of the PAIRS data items 508 includes a FIRST_SINGLE and a SECOND_SINGLE data item, which are each a pointer to a particular SINGLE data item 502 within the SINGLES_TABLE 504. Each PAIRS data item 508 further includes a 16-bit value which indicates the time interval between the two SINGLE data items 502 TOA values. Thus, each of the PAIRS data items 508 effectively points to a received transmission and denotes the interval of that transmission.

As is further discussed below in conjunction with FIG. 10A and 10B, when three symbols are successfully received from a transmitter such as the wireless transmitter $W_A$ 100, those three transmissions could be matched up as follows. First, the interval between the first transmission and the second transmission, as compared to the interval between the second transmission and the third transmission will be the same (or of a known relationship). Thus, the software 304 can examine the SINGLE_TABLE 506, and the INTERVAL values within that table 506, to determine if a previous possible pair had an interval that matched the interval between the present received data item under investigation and the second data item of the possible pair. This will be further understood in the discussion of the software and FIGS. 10A and 10B, but to summarize, when three data items have intervals that are the same or related in a known way, and the middle data item is the same for both potential pairs, then it is determined that the three data items were transmitted from the same transmitter $W_A$ 100.

Once a particular transmitter, such as the transmitter $W_A$ 100, has been either partially or fully identified, it is placed into an IDENTITY_TABLE 510, illustrated in FIG. 9F. This IDENTITY includes a WIN field of 64 bits, which stores a wireless identification number. Although the WIN field is 64 bits, it will be understood that when a transmitter such as the $W_A$ 100 is first partially identified, not all 64 bits stored in the WIN field will be valid. The number of bits that are presently valid within the WIN field is indicated by an IDENTIFIED field, which is a 4-bit counter of the number of valid nibbles in the WIN field. As additional symbols are received via the antennas and identified based on time of arrival, that identity is added to the WIN field and the IDENTIFIED variable is incremented until it reaches a value of 15, including all 16 nibbles have been identified.

Further, a SYMBOL_INDEX value is an index into the WIN field to indicate what the next expected symbol is going to be. Of note, if the SYMBOL_INDEX value exceeds the IDENTIFY value, the next symbol is still unknown because the WIN has not yet been fully received.

Two values, a LAST_TOA and a NEXT_TOA value, indicate the normalized 32-bit time of arrival of the last received symbol for this transmitter, and the normalized next expected time of arrival for this transmitter. This next expected time of arrival in NEXT_TOA is in part determined based on an INTERVAL field, which indicates the basic determined interval for the transmitter. As previously discussed, generally the interval will be constant, but it could be arbitrarily altered to reduce collisions.

Finally, a SYMBOL_COUNTER field is a counter of the number of times a particular transmitter has transmitted. This counter is preferably included in a portion of the data transmitted by the transmitter itself. Specifically, the SYMBOL_COUNTER field would preferably correspond to the data 402 of FIG. 8.

These various identities are stored in an IDENTITY_TABLE 512, illustrated in FIG. 9G, which is simply an array of types of IDENTITY 510.

It will be appreciated that variety of other data items can be associated with the structures of FIGS. 9A–9G. Specifically, the structures of FIGS. 9A–9G are principally directed to identifying transmitters, rather than the accumulation of data and the processing of data. Other structures could be employed for data processing and accumulation, as well as identifying a particular location for a transmitter. Further, a variety of other data items could be employed for the acquisition of telemetry data from a transmitter.

Figure 10A:
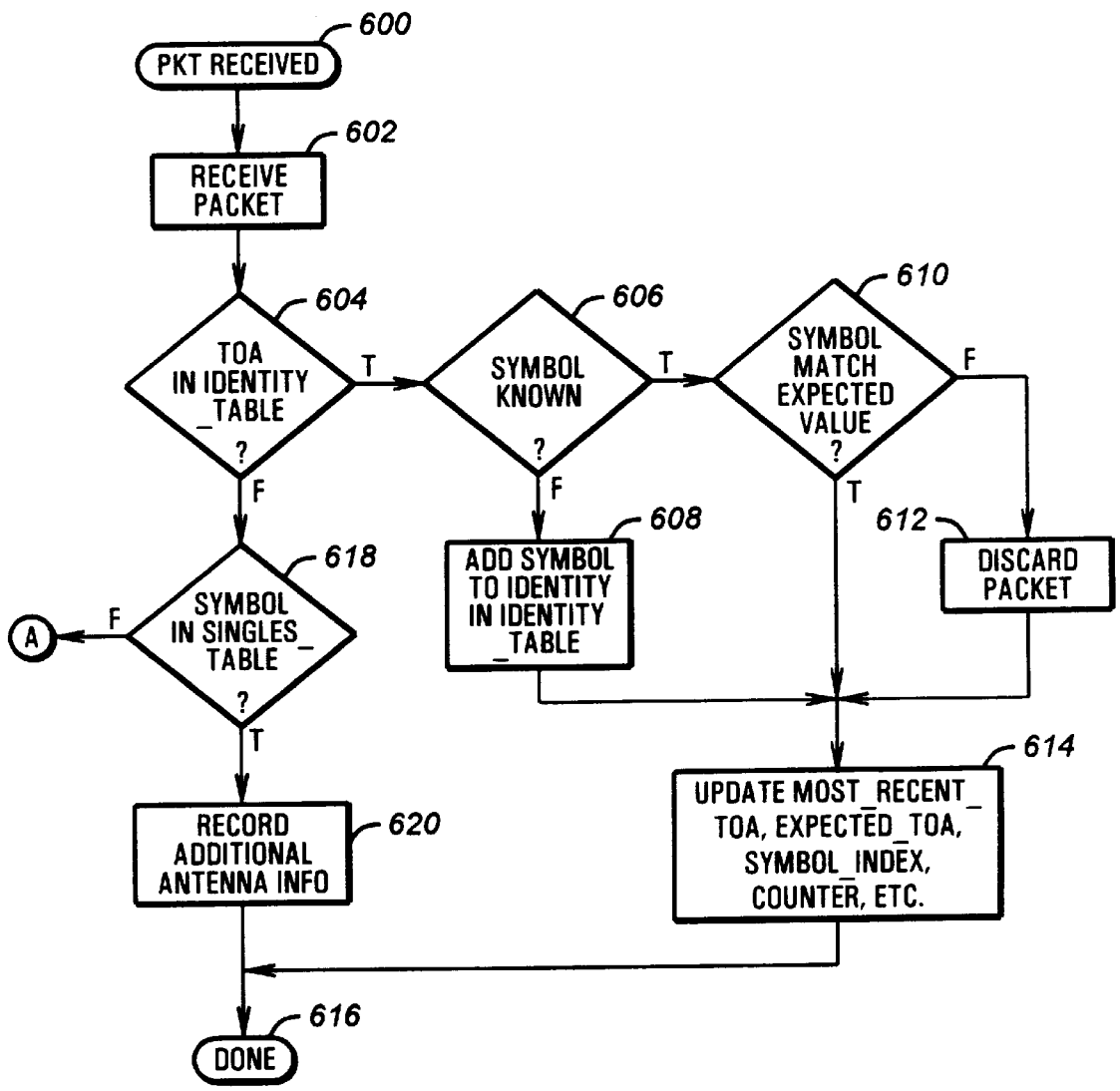
FIGS. 10A–10B are flow charts illustrating transmitter identification according to the invention.
Figure 10B:
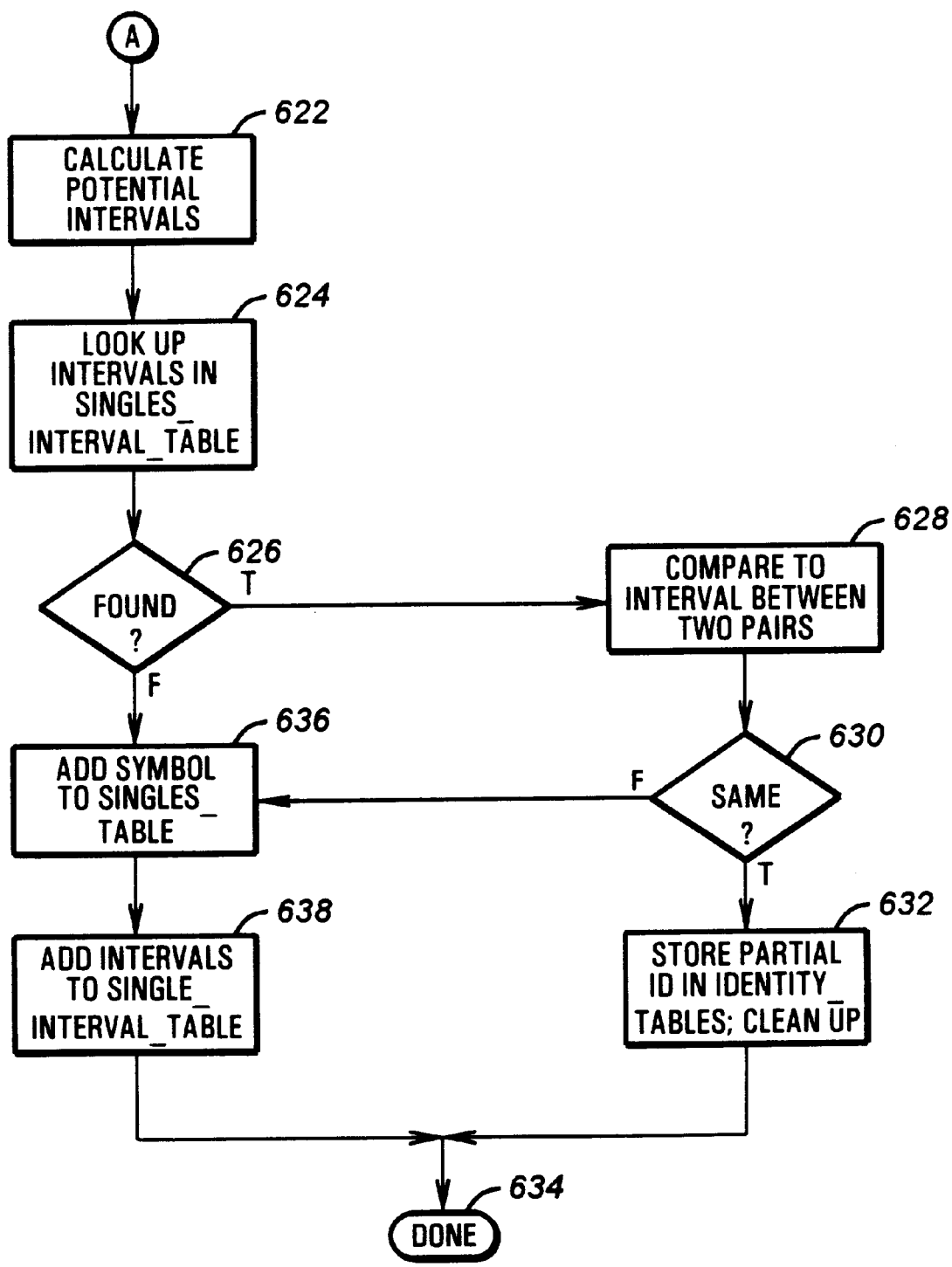

Turning to FIGS. 10A and 10B, illustrated is a flow chart of a typical routine used by the software 304 of the server 112 to identify particular transmitters within the system S. The routine begins at a step 600 when a packet of data has been received from one of the antennas $A_1$ 104, $A_2$ 106, or $A_3$ 108. This packet is in the form of an EVENT structure 500. Beginning at a step 602, the EVENT structure 500 is received, and it is assumed in this embodiment that the TOA field is normalized to the time base of the server 112.

Proceeding to a step 604, it is determined whether the TOA within the EVENT structure 500 is found within the IDENTITY_TABLE 512. Specifically, it is determined whether one of the IDENTITY structures 510 includes a NEXF_TOA field that matches the TOA of the EVENT, plus or minus certain error tolerance. If so, in the disclosed embodiment it is presumed that the received symbol is in fact part of an already identified transmitter, such as the transmitter $W_A$ 100. So, control proceeds to step 606, where it is determined whether the SYMBOL field of the received EVENT 500 matches the corresponding symbol within the IDENTITY structure 510 with the matching NEXT_TOA field. This would not be true if the IDENTITY 510 has not been fully established, and the SYMBOL_INDEX field is greater than the IDENTIFIED field of the matched IDENTIFY 510.

If the SYMBOL value of the EVENT 500 is not known at step 606, control proceeds to step 608, where the SYMBOL value of the EVENT 500 is stored within the WIN field of the IDENTITY structure 510 at a location specified by the SYMBOL_INDEX value of the matched IDENTITY 510.

If at step 606, however, the SYMBOL is known within the matched IDENTITY structure 510, control proceeds to step 610, where it is determined whether the SYMBOL value of the present EVENT 500 matches the symbol within the IDENTITY 510 as specified by the SYMBOL_INDEX value into the WIN. These values should match, indicating that the received symbol is in fact from the identified transmitter such as $W_A$ 100. If not, control proceeds to step 612, where in the present embodiment, the packet is discarded. There are other potential approaches to handling an "incorrect" received symbol, such as reverting a previously identified transmitter to a non-identified status, but for the simplicity they are not shown here.

From step 608, from step 612, and from step 610 if the SYMBOL does match the expected value, control proceeds to step 614, where various aspects of the matched IDENTITY structure 510 are updated. For example, the SYMBOL_INDEX value is incremented if a valid symbol was received, the IDENTIFIED value is incremented if it is not yet equal to 15, the NEXT_TOA value and LAST_TOA value are calculated and stored, the SYMBOL_COUNTER is incremented if the received value is a header value, and various other housekeeping is performed.

In this regard, it should be noted that a header symbol, when received, is used to align the WIN of an identity. For example, a new transmitter may enter the omnidirectional antenna $A_2$ 106 range, but the first values received would generally not be a header value. But the system can continue to receive and store nibbles of the WIN until a header value is received, at which point, the SYMBOL_INDEX and the values stored in the WIN are adjusted so that the first nibble is in the appropriate position. From step 614, control proceeds to step 616, with processing of the received packet begun at step 600 complete. The routine will be reentered when another packet is received.

From step 604, if the TOA is not present in the IDENTITY_TABLE 512, the received symbol is not a part of a previously identified transmitter. Control in this case proceeds to step 618, where it is determined whether the SYMBOL portion of the received EVENT 500 is present in the SINGLES_TABLE 504. If so, this means another antenna has already transmitted and the server 112 has already stored this particular symbol with its corresponding TOA as a SINGLE item 502 within the SINGLES_TABLE 504. So, this particular received symbol does not need to again be stored in the SINGLES_TABLE 504. Therefore, control proceeds to step 620, where any additional antenna information is stored if desired. This may be desired because at this point, it is clear that more than one antenna, such as the antennas $A_1$ 104, $A_2$ 106 and $A_3$ 108, has received this particular transmitted symbol from a particular transmitter such as $W_A$ 100 or $W_B$ 102. By storing additional antenna information, the particular location of the transmitter can ultimately be determined. Control proceeds from step 620 to step 616, where the routine is complete.

From step 618, if the received SYMBOL and the EVENT 500 are not in the SINGLES_TABLE 504, control instead proceeds to step 622. In this step, potential intervals are calculated between the symbol and TOA within the current EVENT 500 and previously stored SINGLES data items 502 within the SINGLES_TABLE 504. This process generally involves matching a symbol and TOA within the current EVENT 500 with any SINGLE data items 502 that occurred a certain amount of time earlier. For example, assume it is known that all transmitters in the system transmit with a periodicity of one second plus or minus ten percent. Then, any SINGLES data items 502 that occurred outside that window earlier cannot be from the same transmitter, with such appearing with the current symbol and TOA within the current EVENT 500 is impossible. Thus, such "out of range" previous SINGLES data items 502 are not stored with the current EVENT 500 as a potential interval. Only those intervals which are permissible are actually calculated to be potential intervals.

Proceeding to step 624, the calculated intervals are looked up in the SINGLES_INTERVAL_TABLE 506. Specifically, the interval calculated in step 622 is looked up in the various PAIRS data items 508 within the SINGLE_INTERVAL_TABLE 506. If the interval is the same as a previous interval, control proceeds from a step 626 to step 628, where it is determined whether the stored INTERVAL item of the PAIRS item 508 which is a match can be the correct pair. Specifically, even if the two intervals match, the SECOND_SINGLE must correspond to the SINGLE with which the present events symbol has been used to calculate the present interval. That is, the series of symbols must be FIRST_SINGLE and then SECOND_SINGLE of a particular pair, followed by the SYMBOL within the present EVENT 500. If so, as determined at a step 630, control proceeds to step 632.

At step 632, a partial identity is stored as an IDENTITY item 510 within the IDENTITY_TABLE 512. Further, the SINGLES_TABLE 504 and the SINGLE_INTERVAL_TABLE 506 is "cleaned up" by removing any corresponding singles, intervals, and possible pairs corresponding to the identified items. From step 632, control proceeds to step 634, where the routine is complete.

At this point, it should be appreciated that this disclosed technique is illustrative only. For example, it may be required that more than three consecutive received symbols be identified as having the same intervals to positively identify a particular transmitter.

At step 626, if calculated intervals are not found in the SINGLE_INTERVAL_TABLE 506, and at step 630, if the interval is not positively identified, control instead proceeds to step 636, where the SYMBOL and the TOA of the present EVENT 500 is added to the SINGLES_TABLE 504 as a SINGLE item 502. Control then proceeds to step 638, where the calculated possible intervals are added to the SINGLE_INTERVAL_TABLE 506 possible pairs. From step 638, control proceeds to step 634, where the routine is complete.

Other software would also typically be involved in the identification and tracking system according to the invention. For example, background "watch dog" software would monitor the SINGLES_TABLE 504 and the SINGLES_TABLE 506 and eliminate any stale data. Further, error checking and handling software can process spurious or out of tolerance data.

Further, once a particular transmitter is identified, error handling and monitoring software, including portions of the routine of FIGS. 10A and 10B, can remove an item as identified once symbols are no longer being received from that transmitter.

Exemplary code for acquiring the various transmitters is attached as Appendix A.

Further, the particular code used for location tracking is not shown. Once a transmitter is identified, however, it is tracked and its presence located based on each symbol received. For example, the IDENTITY data item 510 within the IDENTITY_TABLE data item 512, would typically include further data items corresponding to which antennas had most recently received data from that particular transmitter. Then, tracking software can determine the location of the transmitter based on that data. This is further understood in conjunction with U.S. Pat. No. 5,119,104, entitled Location System Adapted for use in Multipath Environments, issued Jun. 2, 1992; U.S. Pat. No. 5,276,496, entitled Optical Receiver for Area Location System, issued Jan. 4, 1994; U.S. Pat. No. 5,387,993, entitled Method for Receiving and Transmitting Optical Data and Control Information to and from Remotely Located Receivers and Transmitters in an Optical Locator System, issued Feb. 7, 1995; U.S. Pat. No. 5,355,222, entitled Optical Receiver for Area Location System, issued Oct. 11, 1994; and U.S. Pat. No. 5,548,637, entitled Method and Apparatus for Locating Personnel and Objects in Response to Telephone Inquiries, issued Aug. 20, 1996.

ALTERNATIVE, ONE BIT PER SYMBOL TECHNIQUE

Turning to FIGS. 11–15B, illustrated is a simplified embodiment in which each transmitter has a 9-bit identification value. This simplified system is useful for demonstration purposes, both in illustrating the acquisition of the identification, the tracking by multiple antennas, the bandwidth occupation, the protocol of particular symbols, and how those particular symbols are transmitted from an antenna to the signal processor. This alternative embodiment is also exemplary of the variety of actual implementations available while using the techniques according to the invention. The embodiment of FIGS. 11–15B could be used in a 64-bit identification value technique while only transmitting one bit per second, and could be used in a variety of other transmit rates using a variety of pulse mapping techniques.

Referring to FIG. 11, transmissions from two transmitters are shown. A first transmission 800 from a first transmitter illustrates the periodic transmission of a 9-bit identification value "9'6010000001". Slightly offset and asynchronous to that transmission 800 is a transmission 802, which is a transmission by a second transmitter of a identification 9'b 000111010. The transmission format is a start of transmission, or SIX, symbol followed by nine either 0 or 1 symbols. The format of these symbols are discussed in more detail below in conjunction with FIGS. 13A and 13B. Referring to the details of the transmission 800, however, FIG. 12 shows the timing of these symbols. The SIX symbol, as well as the various 0 and 1 symbols, are each transmitted in this embodiment in approximately one millisecond or less. The time between symbols is approximately one second. Thus, the bandwidth is around 0.1 percent per transmitter. The bandwidth could be reduced to much less by reducing the amount of time used to transmit a particular symbol. This can be done in a variety of ways, and again is discussed below in conjunction with FIGS. 13A and 13B.

In this particular embodiment, the amount of time between an initial and a second pulse establishes what type of symbol is being transmitted. In this particular embodiment, additional telemetry data, ranging pulses, and the like are not employed. They could, however, be appended to each transmission. Further, a single bit is transmitted during each transmission. Again, this can be modified as desired, allowing some other multiple of bits to be transmitted during each transmission period, such as 4 bits as is disclosed in FIGS. 2A–2C.

Figure 13A:
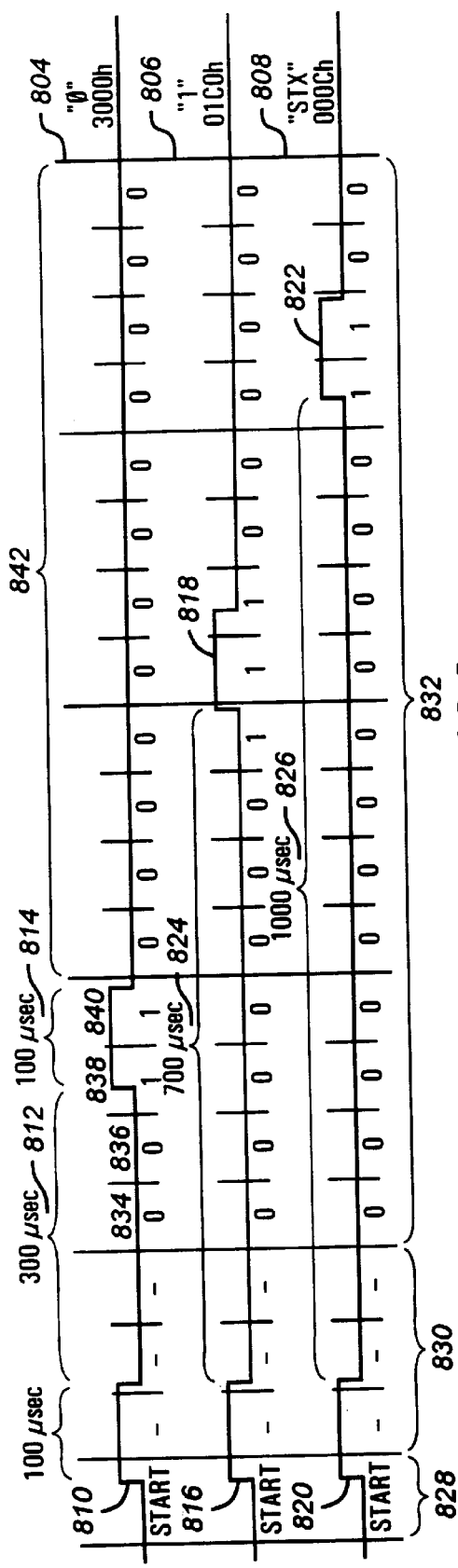
FIGS. 13A and 13B are timing diagrams illustrating received data according to the invention.
Figure 13B:
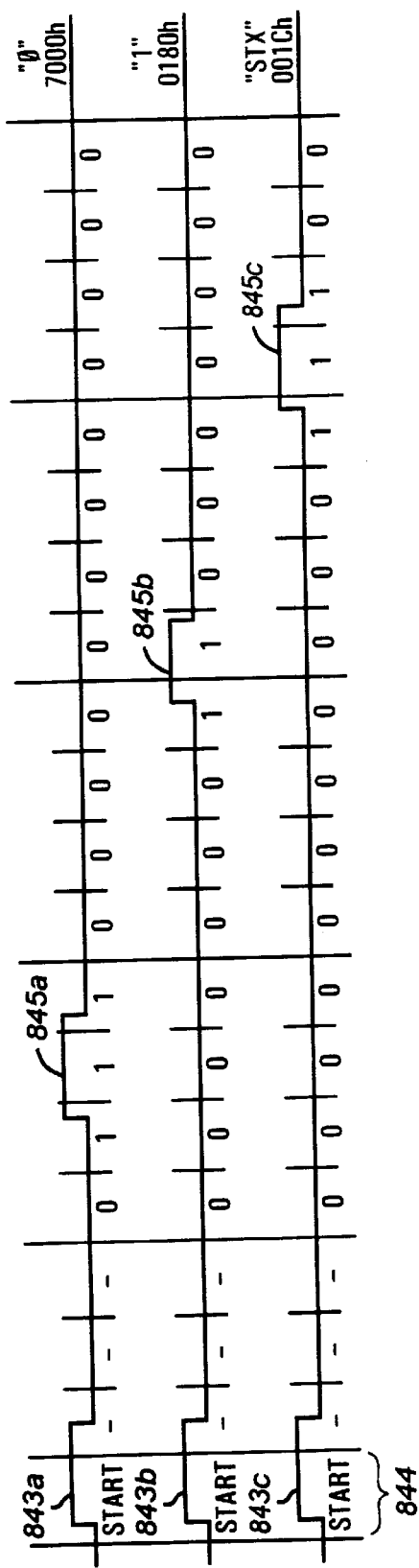

Turning to FIGS. 13A and 13B, details of the particular transmission format as well as how the transmitted pulses are received and then transmitted on to the signal processor 112 is shown. Referring to FIG. 13A, shown is a timing diagram with the timing of a 0 symbol 804, a 1 symbol 806, and a STX symbol 808. The transmission of the 0 symbol 804 is addressed first. In this embodiment, a 100 microsecond start bit 810 is first transmitted, followed by a 300 microsecond silent period 812, and then a 100 microsecond pulse 814. The start and end pulses 810 and 814 are preferably formed by turning on a 900 megahertz carrier transmitter for 100 microseconds. The 1 symbol 806 and the STX symbol 808 are similarly formed with start and end bits 816, 818, 820, and 822, but the 1 bit includes a 700 microsecond off period 824 and the STX symbol has a 1000 microsecond off period 826.

The timing of these symbols can be greatly reduced. For example, the 100 microsecond pulses could be reduced to 10 microseconds, and the off periods could similarly be reduced by an order of magnitude. Doing so, however, requires the receiver to have a higher "pulse map" resolution, as is now discussed. In the disclosed embodiment of FIG. 1, it would be possible for the antenna A1 104, for example, to itself detect the 100 microsecond pulse 810, the 300 microsecond off period 812, and then the 100 microsecond on 814 forms a 0 symbol 804. It could then transmit that 0 symbol on to the signal processor 112. According to the present embodiment of the invention, however, the antenna does not decipher the meaning of the transmitted signals and then forward the deciphered information on to the server 112. Instead, the antenna creates a "pulse map" which effectively is a time slot mapping showing when the carrier is being received. The server 112 then deciphers the meaning of that pulse map. Using this technique, the "intelligence" can be embedded in the server 112, and as different transmitters are introduced into the system which may have different transmission formats, it is unnecessary to alter the antennas.

To this end, each antenna includes an internal clock that counts at a high rate of speed. Here, a first interval 828 is shown during which each of the three exemplary symbols starts transmitting its first pulse. This interval 828 in the illustrated embodiment is approximately 70 microseconds. When a 900 megahertz transmission is received during a particular interval, the antenna recognizes this as the start of a symbol transmission. It waits for three 70 microsecond intervals 830, and then begins acquiring data which will become the pulse map. Specifically, in this embodiment, the following 16 intervals 832 are monitored, and whenever a 900 megahertz transmission is received during any portion of an interval, a 1-bit is assigned in the pulse map corresponding to that interval. Otherwise, a 0-bit is assigned corresponding to that interval. This pulse map could be extended indefinitely, such as until no 900 megahertz transmission is received for at least a predetermined number of 70 microsecond intervals. In any case, referring to the symbol 0 804, it is seen that during the first two intervals of the pulse map 834 and 836, no 900 megahertz transmission is received from the transmitter, so these are mapped as 0 bits. During the following two intervals 838 and 840, however the pulse arrives, so these two intervals are mapped as binary 1 bits. The following 12 intervals 842 receive no transmission, and are thus assigned a value of binary 0. Thus, when the 0 symbol 804 is sent by a transmitter, the antenna receives it in FIG. 13A as a 16'h 3000 value, which is transmitted over the network 110 to the signal processor 112. Similarly, a 1 symbol maps to 16'h01C0 and the STX symbol 808 maps as a 16'h000C.

Turning to FIG. 13B, it is seen that different pulse maps can be generated for the same symbol. Specifically, in FIG. 13B, three start pulses 843A, 843B, and 843C occur early in a first interval 844. This results in corresponding end pulses 845A, 845B, and 845C falling into slightly different intervals within the pulse map. Therefore, in this case the 0 symbol maps as 16'h0700, the 1 symbol maps as 16'h0180, and the SIX symbol maps as 16'h001C.

These slightly different exceptions can occur both because of the transmission rate of the transmitters, the fact that the transmitters and the antennas clocks are not synchronized, and spreading that can result from reflections and noise during the transmission of the pulse.

Using intelligence algorithms, the variation in the pulse maps is readily accommodated by the signal processor 112. Referring to FIG. 14, the particular decoding for these pulse maps is shown. Specifically, an STX symbol is determined to have occurred whenever a pulse map 846 occurs—specifically, when one of the final 7 values is a 1. Similarly, a 1 is decoded when a pulse map 848 occurs again where one of the middle three values is a 1. Finally, a 0 is decoded when a pulse map such as 850 occurs—that is, when one of the initial six intervals mapping as a 1.

But the particular deciphering of the pulse map is not critical—the point is the deciphering occurs not at one of the antennas, such as the antenna A₁104, A₂106, or A₃108, but instead at the signal processor 112. Therefore, if different transmitters are used employing a different protocol, the older antennas can still be used, as long as software within the signal processor 112 is updated. That is, employing pulse mapping allows the decoding of symbols and transmissions into their particular meaning to occur at the signal processor 112 rather than within one of the intelligent antennas.

Turning to FIGS. 15A and 15B, shown are both the data packets transmitted by a particular antenna or receiver, as well as that data as decoded by the signal processor 112. Whenever a receiver receives a transmission such as illustrated in FIGS. 11–14, that receiver then transmits a data packet over the network 110 as illustrated in FIG. 15. First, it transmits a header symbol 852. It then transmits a sequence number 854. This is simply a incrementing value between 0 and 256 which allows the signal processor 112 to ensure it has not missed any data packets from a particular receiver. Next included in the data packet is a packet type 858. This is normally a space character, or "", but would be an exclamation point, or "!" for a data packet intended to indicate to the signal processor 112 that the receiver is "still alive". The next data item in a data packet is a receiver number 860. This is preferably a 16-bit value that represents a unique receiver identification within the system. Next is a time of arrival 862, which in the disclosed embodiment is a 32-bit value that, represents 70 microsecond tics of the receiver's counter. Similarly, the pulse map is a 16-bit value representing the pulse map as discussed in FIGS. 11–14 previously.

In FIG. 15A, two packets of data 864 and 866 are shown transmitted to the signal processor 112 by a receiver EC03 and a receiver EC05. It is seen that the time of arrival 862 of these packets is slightly different, perhaps because the clocks of the two receivers are not synchronized. But, these represent the same received pulse by the two separate receivers. In this case, these packets represent a "1" symbol.

Turning to FIG. 15B, it is appreciated how the signal processor 112 decodes the packets transmitted by the various receivers and antennas here has corresponded packets sent over the network by a first receiver 868 with packets received by a second receiver 870. By corresponding various transmissions, such as the STX 872, the "TOA" of the first receiver and the second receiver can be correlated. That is, using a variety of transmissions, the 70 microsecond clock of the first receiver 868 and the second receiver 870 can be synchronized. In any case, it is seen that a sequence of symbols 874 and 876 have been received by the first and second receivers 868 and 870 which correspond to a transmitter that is transmitting an STX symbol followed by a sequence of identification bits that map to 9'b010000001. (One transmitted packet 878 is discarded because it is a "keep alive" packet transmitted by the receivers 868 and 870). Referring back to FIG. 15A, the packets 864 and 866 are seen to correspond to the received 1 symbol 880 in FIG. 15B. It will be further appreciated that additional antennas or receivers could be added to the system, and that the presence of a transmitter to one receiver but its absence to another can be used for location of the transmitter.

SAMPLE TRANSMITTER

Figure 16:
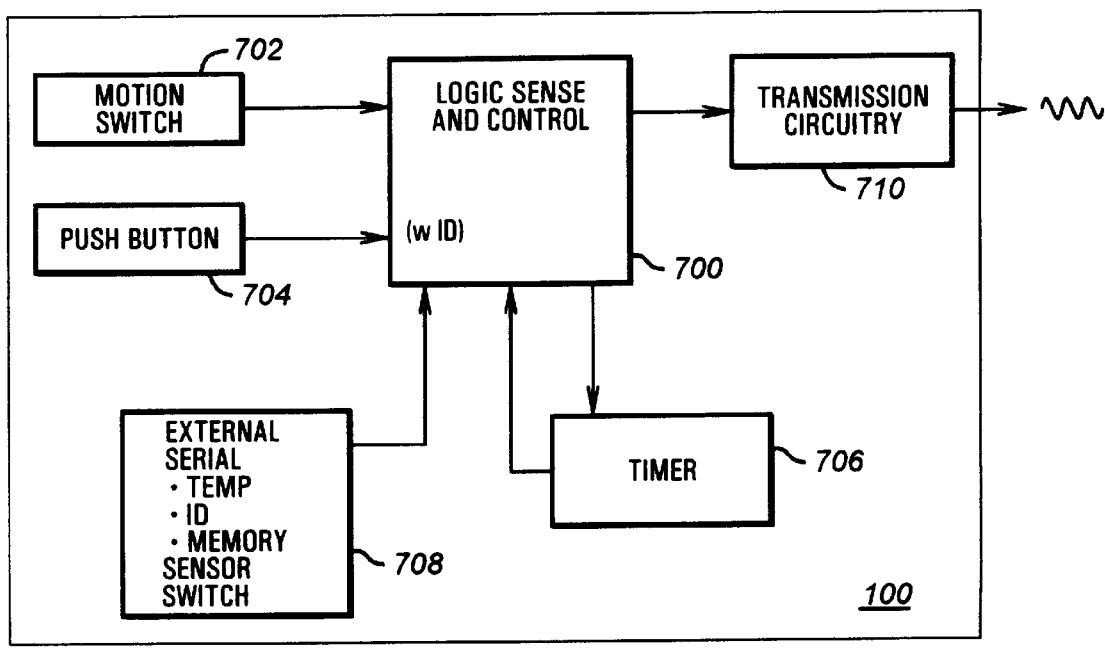
FIG. 16 is a block diagram illustrating transmitter circuitry according to the invention.
Figure 17:
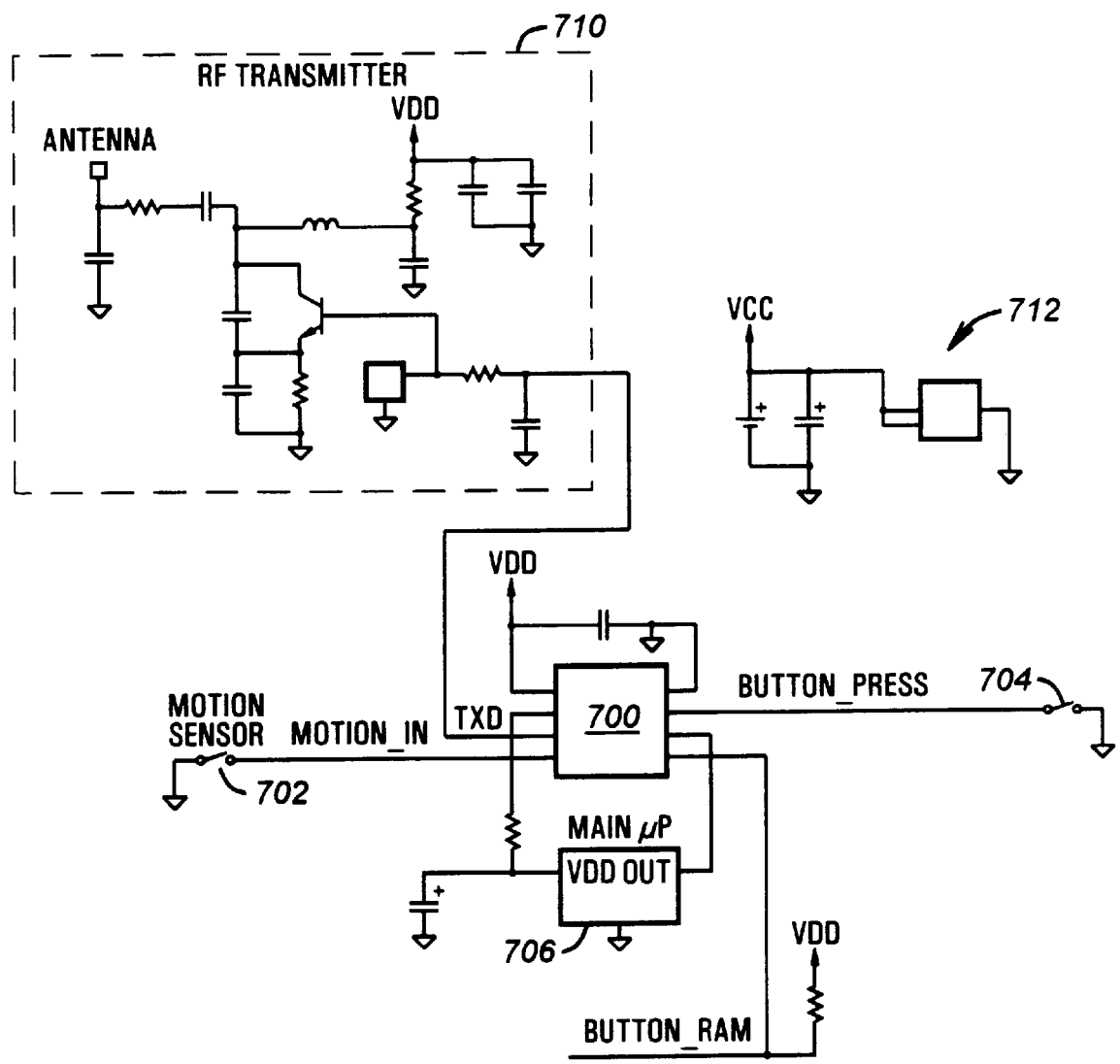
FIG. 17 is a schematic illustration of a transmitter according to the invention.

Turning to FIGS. 16 and 17, the construction of a transmitter within the wireless transmitter W$_A$ 100 is shown. Preferably, the transmitter transmits a 900 megahertz signal generated by Colpitts oscillator. That oscillator is turned on and off to generate an appropriate sequence of pulses. Block and schematic diagrams of the wireless transmitter W$_A$ 100 is shown in FIGS. 16 and 17. As illustrated, a logic sense and control unit 700 can have an input from a motion switch 702 and a push button 704 as optional features. Further, a watchdog timer 706 periodically wakes up the logic sense and control unit 700 at appropriate times for transmission. This reduces overall power consumption. An external serial port 708 can be provided which can provide an external ID, or include memory, temperature, or addressable transistor inputs, as well as a binary switch close sense input. The logic sense and control unit uses all of these inputs to create appropriate strobes via transmission circuitry 710. Turning to FIG. 17, shown as typical transmitter circuitry that would be used according to the invention. The motion sensor 702 and push button switch 704 both have direct inputs to logic sense and control circuit 700, which in the disclosed embodiment is a PIC 12C508 processor. This is controlled by the watchdog timer 706, which in the disclosed embodiment is an MN1381-E. The logic sense and control circuit 700 controls the RF transmitter block 710, which is effectively a Colpitts oscillator. A battery circuit 712 powers the entire system. Exemplary software for execution by a logic sense and control circuit 700 is illustrated in the attached Appendix B.

SAMPLE RECEIVER

Figure 18B:
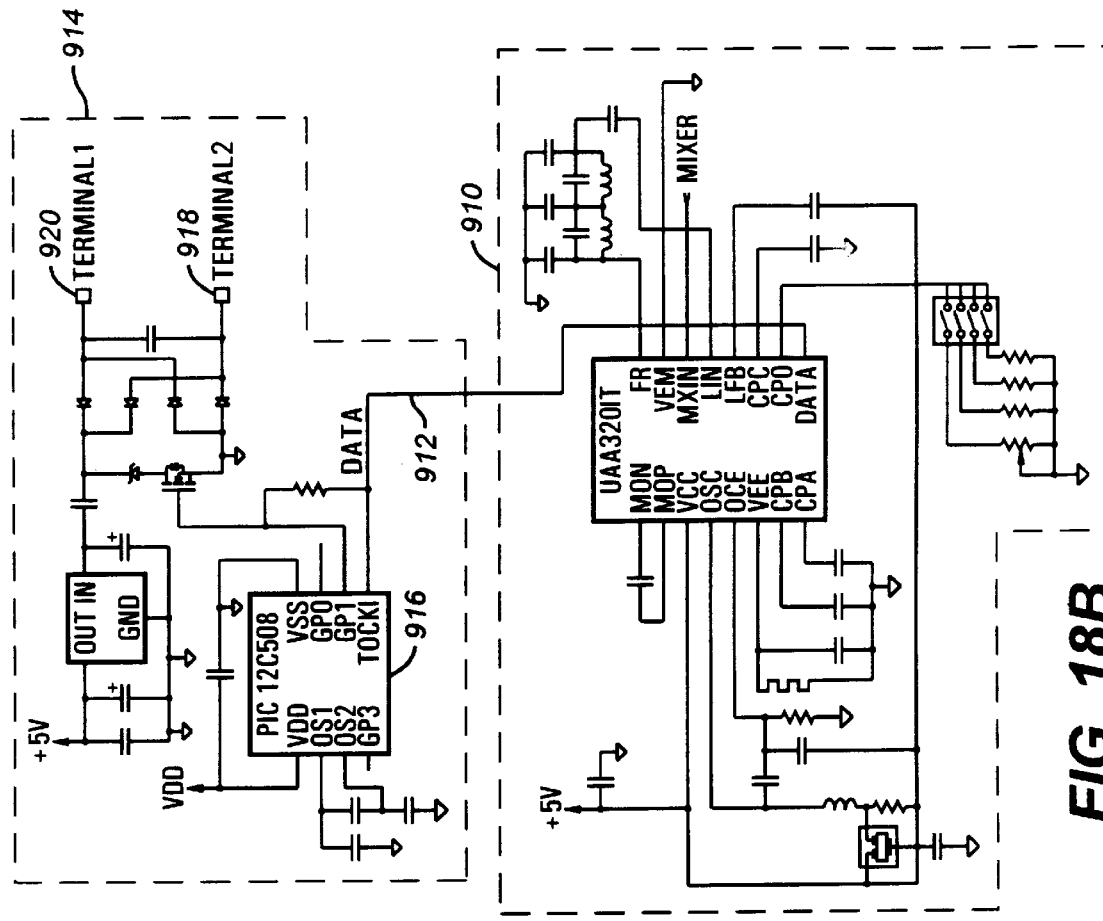
FIG. 18 is a schematic illustration of a receiver according to the invention.
Figure 18A:
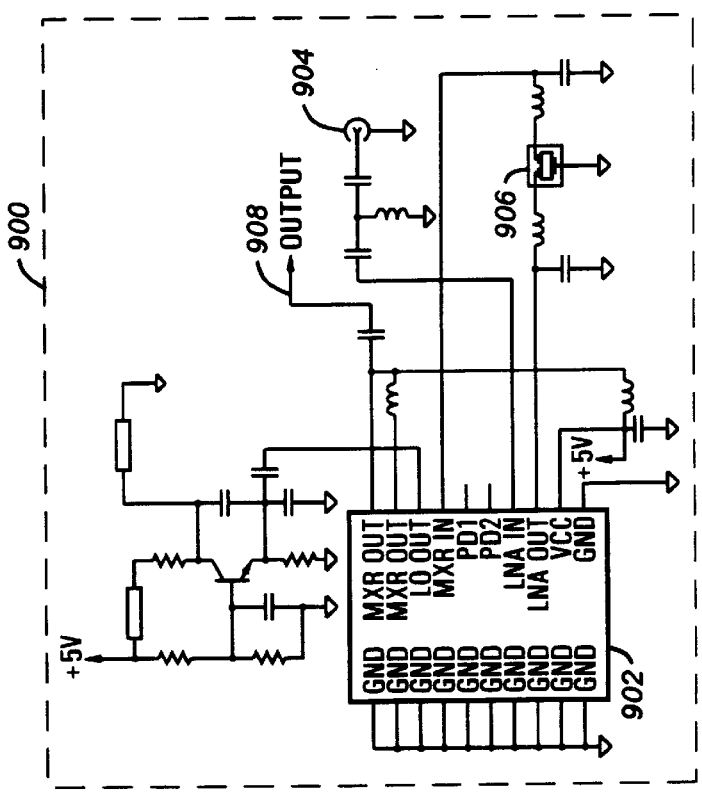

Turning to FIGS. 18A and 18B, shown is a sample receiver section for the antenna such as the antenna $A_1$ 104, $A_2$ 106, or $A_3$ 108, that is connected to the server 112. Circuitry block 900 is simply a standard receiver section for receiving a signal of around 900 megahertz. It includes various components such as a mixer 902, an antenna 904, a crystal 906, and provides an output signal 908. This is fed into processing section 910, shown in FIG. 18B. This processing section further processes received data that has been received from the mixer section 900, and provides output data on a data signal 912. This data signal is provided to a microcontroller as section 914. This microcontroller section 914 includes a microcontroller 916, here a PIC 12C508 microcontroller. It processes data, and then provides signals to the server 112 over a network via connectors 918 and 920.

Exemplary software for execution by the microcontroller 916 is illustrated in Appendix C.

CONCLUSION

Therefore, according to the invention, a transmission and reception system is provided in which identification data is distributed over a number of discreet transmission periods. After acquiring enough identification data to either tentatively or affirmatively identify a particular transmitter, the receiving system can identify a particular transmitter based not on the data transmitted, but instead on when it is transmitting a particular discreet burst. This can be used in either a wireless or a wired system.

Further, using smart receivers, the receivers can pulse map the received data rather than actually interpret the meaning of the data itself. By transmitting these pulse map and then time stamped received transmissions over a network, a server can process packets received by a number of antennas or receivers, and positively identify both the identity and the location of a particular transmitter.

Further, various security features can be embedded, such as encrypting the actual identification transmitted by the transmitters, and by providing an arbitrary interval between various transmission which is not necessarily the same from transmission to transmission, but is determinable at the receivers.

Using this system, a large amount of identification data can be transmitted, with a relatively high transmission frequency, but with greatly reduced power consumption. This is desirable in battery powered transmitter for both identification, location, and transmission of telemetry data in a system.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method of identifying a transmitter that has identifying information, comprising the steps of:
    transmitting portions of the identifying information from the transmitter at predetermined intervals;
    receiving the transmitted portions of the identifying information;
    positively identifying the transmitter after receiving a plurality of the transmitted portions of the identifying information based on the identifying information; and
    subsequently identifying the transmitter based on the time of arrival of subsequently received transmitted portions of the identifying information relative to the time of arrival of previously received transmitted portions of identifying information.

2. The method of claim 1, wherein the positively identifying step further comprises the step of further comprising positively identifying the transmitter based on the entire identifying information after the entire identifying information has been received in portions.

3. The method of claim 1, further comprising the steps of:
    verifying the subsequent identification of the transmitter based on time of arrival by comparing subsequently transmitted portions of the identified information with previously received portions of the identifying information.

4. The method of claim 1, wherein the step of receiving transmitted portions further comprises the step of receiving the transmitted portions of identifying information at more thin one receiver.

5. The method of claim 1, wherein the step of receiving transmitted portions further comprises the step of receiving transmitted portions from both a first and second transmitter.

6. The method of claim 5, wherein the step of positively identifying the transmitter further comprises the step of:
    discriminating between the portions of identifying information transmitted by the first transmitter and portions of identifying information received from the second transmitter based on intervals between the transmission of the portions from each transmitter.

7. The method of claim 1, wherein the step of transmitting further comprises the step of:
    transmitting using a radio frequency signals.

8. The method of claim 1, wherein the step of transmitting portions of identifying information at predetermined intervals further comprises the step of transmitting at intervals of about one second and transmissions of about one millisecond.

9. The method of claim 1, wherein the step of receiving transmitted portions further comprises the steps of:
    receiving the transmitted portions of the identifying information at a receiver;
    time-stamping the transmitted portions of identifying information; and
    transmitting over a network the time-stamped portions of the identifying information to a processor.

10. The method of claim 1, wherein the step of receiving the transmitted portions further comprises the steps of:
    receiving the transmitted portions of identifying information at a receiver;
    creating a pulse map representative of the received transmitted portions of identifying information;
    transmitting the pulse map from the receiver to a processor; and
    determining at the processor the meaning of information embedded within the pulse map.

11. The method of claim 1, wherein the step of transmitting portions-of identifying information further comprises the step of transmitting a signal bit of information regarding each transmission of portions of identifying information.

12. The method of claim 1, wherein the step of transmitting portions of identifying information further comprises the step of transmitting four bits of information during each transmission of portions of identifying information.

13. The method of claim 1, wherein the identifying information comprises a nine bit code.

14. The method of claim 1, wherein the identifying information comprises a thirty-two bit code.

15. The method of claim 1, wherein the step of transmitting portions of identifying information further comprises the step of encrypting the identifying information before transmitting the portions of identifying information.

16. A method for transmitting data, as described in claim 1, wherein each predetermined interval is the same length.

17. A method for transmitting data, as described in claim 1, wherein each transmission is followed by a significantly longer non-transmit period.

18. A method for transmitting data, as described in claim 1, wherein each transmission pulse has a duty cycle of less than 0.1%.

19. A transmitter for transmitting identifying information, comprising:

identifying information stored within the transmitter;

transmit circuitry for transmitting a portion of the identifying information; and control circuitry that separates the identifying information into a plurality of portions of identifying information, and automatically transmits the portions of identifying information at predetermined intervals, wherein the portions of identifying information are subsets of the identifying information, the predetermined intervals providing time of arrival information to a receiving device, the time of arrival being relative to a time of arrival of previously transmitted portions of identifying information.

20. The transmitter of claim 19, wherein the control circuitry further comprises:

circuitry for encoding the identifying information with a counter and a digital signature.

21. The transmitter of claim 19, wherein the control circuitry is an embedded processor.

22. The transmitter of claim 19, wherein the transmitter is a radio frequency transmitter.

23. The transmitter of claim 19, wherein the control circuitry transmits the portions of identifying information at intervals of approximately one second, and wherein the transmission takes approximately one millisecond.

24. A system for receiving transmitted identifying information comprising:

a receiver for receiving transmitted portions of identifying information; and a processor for receiving from the receiver the transmitted portions of identifying information and positively identifying a transmitter based on accumulated portions of the identifying information received from the receiver, and subsequently identifying a transmitter based on the time of arrival of portions of the identifying information to the receiver relative to the time of arrival of previously received transmitted portions of identifying information.

25. The system of claim 24, wherein the receiver is a radio frequency receiver.

26. The system of claim 24, wherein the receiver time-stamps received portions of identifying information before transmission to the processor.

27. The system of claim 24, wherein the receiver encodes received portions of identifying information in a pulse map and transmits the pulse map to the processor, and wherein the processor determines the meaning of the portions of identifying information transmitted from the receiver based on the contents of the pulse map.

28. The system of claim 24, wherein the receiver and processor are connected via a network.

* * * * *